US008965566B2

(12) United States Patent
Berdelle-Hilge

(10) Patent No.: US 8,965,566 B2
(45) Date of Patent: Feb. 24, 2015

(54) DEVICE AND METHOD FOR SORTING BY MEANS OF A STORAGE REGION AND A SORTING REGION

(75) Inventor: Peter Berdelle-Hilge, Constance (DE)

(73) Assignee: Siemens Aktiegesellschaft, Munich (DE)

( * ) Notice: Subject to any disclaimer, the term of this patent is extended or adjusted under 35 U.S.C. 154(b) by 0 days.

(21) Appl. No.: 14/238,203

(22) PCT Filed: Aug. 8, 2012

(86) PCT No.: PCT/EP2012/065512
§ 371 (c)(1),
(2), (4) Date: Feb. 11, 2014

(87) PCT Pub. No.: WO2013/020999
PCT Pub. Date: Feb. 14, 2013

(65) Prior Publication Data

US 2014/0214197 A1 Jul. 31, 2014

(30) Foreign Application Priority Data

Aug. 11, 2011 (DE) ......................... 10 2011 080 801

(51) Int. Cl.
*G06F 7/00* (2006.01)
*B07C 3/02* (2006.01)

(52) U.S. Cl.
CPC ........................................ *B07C 3/02* (2013.01)
USPC ........... 700/226; 700/213; 700/214; 700/220; 700/221; 700/222; 700/223; 700/224; 700/225; 700/228; 700/229

(58) Field of Classification Search
CPC . G06Q 10/08; G06Q 10/087; G06Q 10/0875; B07C 3/00
See application file for complete search history.

(56) References Cited

U.S. PATENT DOCUMENTS 3,884,370 A 5/1975 Bradshaw et al.
4,244,672 A 1/1981 Lund
5,810,174 A 9/1998 Hamada et al.
(Continued)

FOREIGN PATENT DOCUMENTS

DE 10039394 C1 9/2001
DE 10342463 B3 4/2005
(Continued)

*Primary Examiner* — Yolanda Cumbess
(74) *Attorney, Agent, or Firm* — Laurence A. Greenberg; Werner H. Stemer; Ralph E. Locher

(57) ABSTRACT

Objects are sorted according to predetermined groups of sorting feature values. In particular, postal items are sorted according to groups of delivery addresses. A sorting system sorts the objects into a sequence so that all objects with sorting feature values belonging to the same predetermined value group are situated one directly behind another in this sequence. The sorting system has x1 storage subregions, x2 sorting subregions and a sorting plan. The objects are apportioned to the x1 storage subregions. For each storage subregion, an apportionment step is then carried out, in which the objects from this storage subregion are apportioned to the x2 sorting subregions. The apportionment steps are performed one after the other. Each apportionment step, is followed by a sorting and output step for each sorting subregion, in which the objects from this sorting subregion are brought into a sequence in accordance with the sorting feature values and this sequence is output.

12 Claims, 9 Drawing Sheets

(56) References Cited

U.S. PATENT DOCUMENTS

| | | | | |
|---|---|---|---|---|
| 6,501,041 | B1 | 12/2002 | Burns et al. | |
| 6,677,548 | B2 | 1/2004 | Robu et al. | |
| 7,343,219 | B2 | 3/2008 | Berdelle-Hilge | |
| 7,979,155 | B2 * | 7/2011 | Moran et al. | 700/223 |
| 8,374,720 | B2 | 2/2013 | Kechel | |
| 8,457,781 | B2 | 6/2013 | Bailey et al. | |
| 2008/0011653 | A1 | 1/2008 | Stemmle | |
| 2009/0206013 | A1 * | 8/2009 | Moran et al. | 209/584 |
| 2011/0170990 | A1 | 7/2011 | Stemmle | |
| 2012/0150339 | A1 * | 6/2012 | Bjornsson et al. | 700/214 |

FOREIGN PATENT DOCUMENTS

| | | | |
|---|---|---|---|
| DE | 102010022082 | A1 | 12/2010 |
| EP | 0697260 | B1 | 2/1996 |
| WO | 2009035694 | A1 | 3/2009 |

* cited by examiner

DEVICE AND METHOD FOR SORTING BY MEANS OF A STORAGE REGION AND A SORTING REGION

BACKGROUND OF THE INVENTION

Field of the Invention

The invention relates to a method and a device for sorting articles according to predetermined groups of sorting feature values, in particular of items of mail according to groups of delivery addresses.

U.S. Pat. No. 4,244,672 describes a "system for sequencing mail". FIG. 1 of U.S. Pat. No. 4,244,672 shows an arrangement with a "recirculation buffer subsystem 10", a "secondary transport loop 12" and an "output accumulating sub-rack system 14". An upstream. "induction station subsystem 16" consists of three individual "stations 16a, 16b, 16c". The sorting arrangement of U.S. Pat. No. 4,244,672 transports items of mail with the aid of many "carriers 20", which can be constructed for example as in U.S. Pat. No. 3,884,370.

The "stations 16a, 16b, 16c" of the sorting arrangement of U.S. Pat. No. 4,244,672 load the "carriers 20" with items of mail. Each "carrier 20" has an "escort memory 22," in which are stored an identification of a "postman's route" and an identification of the "sequence within the route." The loaded "carriers 20" pass via a "primary transport 18" into the "recirculating buffers 10a, 10b, 10c". "Gates 24, 26, 28" behind "read/write stations 30, 32, 34" discharge filled "carriers 20" from the "buffer subsystem 10" into the "secondary transport. 12. The discharged "carriers 20" circulate in the "secondary transport 12". "Sequencing of the "carriers 20" is established in the "secondary transport 12". A "reader 44" reads, the information on the "memory 22" of a "carrier 20". The items of mail sorted for a letter carrier ("carrier", "postman") pass into an appropriate "output accumulation rack 14", whereby the desired sequence of the items of mail is established for this letter carrier. A "gate 46" is activated at the right time to accomplish this.

U.S. Pat. No. 6,501,041 Bl describes a sorting system which accurately sorts flat items of mail according to route order ("delivery sequence"). Two "primary sortation assemblies 12a, 12b" carry out a first sorting pass ("first pass"). A "sortation mechanism 18" apportions items of mail by means of "chutes 28" to containers 30. A "tray handling system 110" moves the filled containers 30 in a predetermined sequence to an "induct 20" of a "dps sortation assembly 14". In a second sorting pass ("second pass") this "dps sortation assembly 14" produces a route order of the items of mail and discharges the items of mail sorted according to route order into their "final outputs".

DE 10342463 B3 describes a sorting system for sorting flat items of mail 4. A separation device separates the items of mail. A reader reads the addresses on the items of mail. A pocket loading station moves each item of mail into an empty pocket 6 of a rotating ring pocket in each case. Below the pocket ring 5 is a collating conveyor 7 which is divided into sections 8. The pocket ring 5 with the pocket 6 moves relative to the collating conveyor 7. An item of mail slips out of a pocket 6 on a pre-selected section 8 of the collating conveyor 7.

WO 2009/035694 AI describes various methods and devices in order to sort items of mail according to route order. FIG. 16A shows a block diagram for transporting items of mall through a "facility-wide sorting and/or sequencing system", of paragraph [0853]. The arrangement shown there has "input segments 1065", "sequencer segments 1610 ", "storage segments 1615" and a "transport controller 1620". FIG. 16B shows a "transport segment" between the "input segment 1605" and the "sequencer segment subsystem. 1610", cf. section [0855].

FIG. 20A shows a "transportation system" with a "receiving and/or discharge station 2002", cf. section [0938], six "levels 2004 of storage cells, ", cf. section [0939]. FIG. 20B shows a "buffer system 2005," which interacts with the "transportation system" and has individual "storage cells 2015", cf. paragraphs and [0941]. A "collection grid 2018" fills empty "shuttles", which are transported to a "distribution grid 2000", cf. section [0942].

FIG. 20C of WO 2009/035694 A1 shows an arrangement in which an "elevating system 2020" receives items of mail from a "transport path 2022" and distributes them among a plurality of "levels 2020a", cf. section. [0944].

BRIEF SUMMARY OF THE INVENTION

The invention is based on the object of providing a sorting method and a sorting system which in a single sorting pass are able to sort the articles to be sorted to a predetermined maximum number of different sorting destinations, and wherein the last possible time at which an article to be sorted is still able to reach the sorting system in order to be sorted is disposed late.

The object is achieved by a method having the features as claimed and a sorting system having the features as claimed. Advantageous embodiments are disclosed in the dependent claims.

According to the solution a plurality of articles is sorted. Predetermined are a measurable sorting feature and $z \geq 2$ value groups. Each sorting feature value which occurs belongs to exactly one value group. The articles shall be sorted in such a way and are thereby put into at least one sequence such that, after sorting, all articles whose sorting feature values belong to the same value group, are located directly one after the other in the same sequence.

A sorting system is used with at least the following components:

- a storage region with x1 storage subregions,
- a sorting region with x2 sorting subregions,
- a measuring instrument, and
- a data storage device with a computer-accessible sorting plan.

The number[s] x1 and x2 refer to those subregions that are actually used to sort these articles. The sorting system may include additional storage subregions or additional sorting subregions which are used for other sorting tasks or not at all.

The sorting plan assigns to each value group
one storage subregion used respectively and
one sorting subregion used respectively.

The sorting system is designed such that $x1 \geq 2$, $x2 \geq 2$ and $x1 * x2 \geq z$.

For each article to be sorted the following steps are carried out:

- The measuring instrument measures to which value group the sorting feature value of this article belongs.
- The article is transported into that storage subregion which the sorting plan assigns to that value group to which the sorting feature value of this article belongs. The measuring instrument, has previously determined this value group.

As each article is transported into the associated storage subregion the articles are apportioned to the x1 storage subregions.

An apportionment step is consecutively carried out for each storage subregion, a total of x1 apportionment steps therefore in the case of x1 storage subregions used.

The following steps are carried out during the apportionment step for a storage subregion:

All articles to be sorted are transported from this storage subregion to the sorting subregion.

These articles transported to the sorting region are apportioned to the x2 sorting subregions.

During this apportionment each article is transported into that sorting subregion which the sorting plan assigns to the sorting feature value of this article. The effect of these transportations is that the articles are apportioned to the x2 sorting subregions.

The execution of the x1 apportionment steps is terminated once all articles to be sorted have been transported into the storage region and apportioned to the storage subregions. Consequently each article to be sorted is moved into a sorting subregion by way of exactly one apportionment step respectively. As a rule, during an apportionment step a plurality of articles are moved into one sorting subregion respectively. As a rule, the same apportionment step apportions the articles to different sorting subregions.

The x1 apportionment steps are carried out such that during apportionment of the articles to the sorting subregions mixing of articles from different storage subregions is prevented. In particular, an article does not firstly pass from a first storage subregion X1(*i*1) into the sorting region, then an article from a second storage subregion X1(*i*2), and then a further article from the first storage subregion X1(*x*2).

After each apportionment step a sorting and output step is carried out for each sorting subregion used, a total of x2 sorting and output steps per apportionment step therefore.

In each sorting and output step for a sorting subregion X2(*k*), all articles, which are located in this sorting subregion X2(*k*), are each put into a sequence. All articles, whose sorting feature values belong to the same value group, occur immediately one after the other in this generated sequence. No articles with a sorting feature value from another value group are located between two articles with sorting feature values from the same value group therefore. It is possible, but not necessary, to establish a certain sequence of the articles with sorting feature values from the same value group.

The articles which were put into this sequence are transported out of the sorting subregion X2(*k*) in this sequence and are output as a result. The sorting subregion X2(*k*) is then available for a further sorting and output step or for a different sorting task. The invention makes it possible for articles to be sorted in any order and in any accumulation over time and in any arrangement and sequence of sorting feature values to reach the sorting system and be sorted in the storage region during a first phase, regardless of when the articles arrive within the first phase. This sorting in the first phase comprises the step of apportioning the articles to the x1 storage subregions as a function of the sorting feature values.

This first phase ends as soon as the first emptying of a storage subregion is started. The use according to the solution of the storage region makes it possible to have this first phase finish as late as possible in order to be able to include as many articles as possible, and even late-arriving articles, in the first phase and therewith in the sorting process. Furthermore, it is possible to specify a completion time for sorting the articles in the sorting and output steps and have the first phase end as late as possible on the one hand and, as early as necessary on the other hand to still adhere to this completion time.

The articles to be sorted can reach the storage region of sorting system according to the solution in any sequence and in any distribution time-wise. Some prior knowledge of how many articles have which sorting feature value respectively is not required. Pre-sorting is dispensed with as a result.

The sorting system used comprises x1 storage subregions and x2 sorting subregions, a total of x1+x2 subregions therefore. The sorting system is nevertheless able to sort to x1*x2 different value groups without pre-sorting. With x1=4 storage subregions and x2=6 sorting subregions, only x1+x2=10 subregions are therefore required to sort to a maximum of z≤x1*x2=24 different value groups.

The articles are apportioned to the sorting regions in the subsequent sorting and output steps. Since the articles are first apportioned to the x1 storage subregions and then the x2 sorting subregions, the articles are apportioned to x1*x2 different volumes.

In the first phase the storage region of the sorting system according to the solution is used for distributing the articles in the apportionment steps. In this first phase the sorting region is not used to sort these articles. Therefore, during this first phase the sorting region can be used to sort further articles or can be subjected to an inspection, maintenance or repair. Therefore, the sorting system according to the solution reduces the time required to sort the articles and the further articles since the storage region and sorting region can be used so as to overlap time-wise.

Conversely, the storage region is no longer required for sorting these articles after completion of the first phase. Once ail articles have been moved from the storage region in the sorting region, the storage region is available for the apportionment of further articles or for an inspection, maintenance or repair.

The sorting region is located downstream of the storage region. Each article firstly passes through the storage region and then the sorting region. Therefore, no return of articles is required, in which articles to be sorted are transported from the sorting region back to the storage region. In particular, it is not necessary to carry out two sorting passes and to transport articles to be sorted back again after the first sorting pass. This is frequently required in what is known as "two-pass sequencing".

Furthermore, it is not necessary for articles in a storage subregion to be transported along a closed conveyor and be discharged from this closed conveyor by means of a plurality of gates. It is possible instead to use at least a storage subregion or only storage subregions which operate according to the first-in/first-out (FIFO) principle.

The sorting system according to the solution can optionally be operated in various configurations, without having to mechanically modify the sorting system. In one configuration all x1 storage subregions and all x2 sorting subregions are actually used. At least one value group respectively is assigned to each storage subregion and each sorting subregion. In another configuration less than all x1 storage subregions and/or less than all x2 sorting subregions are used. At least one storage subregion and/or at least one sorting subregion are then available for another sorting task. The sorting system according to the solution can be changed over from one configuration to another configuration solely by changing the sorting plan accordingly. For a change in configuration it is not necessary to physically change the sorting system in order to then be able to operate it in a different configuration. The reconfiguration can be achieved solely by installing and using a revised sorting plan. The sorting system can be remotely ("remote") reconfigured therefore. A flexible sorting system is thus provided by the invention.

The high degree of flexibility also increases, the overall reliability of the sorting system. If a storage subregion or a sorting subregion is temporarily unavailable, for example due to a fault or for maintenance, then the remaining storage subregions or sorting subregions can still be used. This changeover can in turn be effected solely by changing the sorting plan, i.e. without mechanical change, and fully automatically and also remotely ("remote"). Redundancy may therefore be provided by the invention.

In one embodiment execution of the x1 apportionment steps is begun once all articles, to be sorted have been apportioned to the storage subregions. In another embodiment at least one apportionment step for a storage subregion is already begun while articles are still being transported into this storage subregion. This embodiment saves time compared to a purely sequential execution.

The sorting system preferably comprises at least one sorter which is used in at least one sorting and output step. In one embodiment even each sorting subregion has one sorter respectively such that the sorting system comprises a total of x2 sorters. In one embodiment each sorter has two sorting stages connected in series. If each first sorting stage is able to sort to x3 different sorting feature values and each second sorting stage to x4 different sorting feature values, the sorting system is able in total to sort the articles to **x1*x2*x3*x4 different sorting feature values and in this connection to x1*x2≥z different predetermined sequences of one value group respectively of sorting feature values. By way of example, for each value group one sequence respectively of the sorting feature values of this value group is predetermined. This sorting to x1*x2*x3*x4 sorting feature values is achieved in a single sorting pass and without an additional temporary store. In order to sort to x1*x2*x3*x4 sorting feature values, a total of x1+x2 subregions with a total of x2*x3+x2*x4** sorters are required.

Each article is preferably grasped and held throughout the entire sorting process at all times by one transport device respectively. It is possible for the article to be transferred from a first transport device to a second transport device during sorting. Because the article is permanently grasped and held it is always possible to predict when a certain article is located at which place within the sorting system. This facilitates transportation in the associated storage subregion and subsequently into the associated sorting subregion. In one embodiment the article is grasped by a holding device throughout its entire stay in the sorting system. It is not necessary to separate the articles during sorting, then stack and subsequently separate them again.

At least one storage subregion preferably has at least two different types of storage unit. These storage units preferably each have a beginning and an end and are arranged parallel to each other. Each storage subregion preferably even has at least two different types of storage unit. The storage units of a first type are able to receive articles of a specific first article type and the storage units of a second type articles of a second article type. By way of example, the storage units of the first type are smaller than the storage units of the second type and therefore require less space but cannot receive articles of the second article type. An article is moved into either a storage unit of the first type or into a storage unit of the second type, depending on whether the article belongs to the first article type or the second article type. By way of example, an article is temporarily moved into a suitable holding device or connected in some other way to an appropriate holding device. The filled holding device is transported into the appropriate storage unit.

In order to determine to which type of article the article belongs a physical parameter is measured, and, more precisely, preferably before the article is transported into a storage subregion. The article is then more accessible for measurements. The embodiment with the different types of storage unit makes it possible for the same sorting system according to the solution to be able to sort different types of article without a universal storage device having to be provided which is often inevitably larger than a storage unit of the first type or second type.

Each article is preferably transported along a conveyor or other conveying device through a storage subregion. Each storage subregion comprises at least one conveyor in each case. The conveyors are preferably all arranged parallel to each other and all have their beginning on the same side and their end on the same other side. This embodiment allows for a mechanically simple construction, in particular because no change in direction is required during transportation of the articles. Each storage subregion preferably operates in a "first in/first out" (FIFO) mode.

It is possible for the articles to be sorted to be transported by means of an arrangement which includes the moving conveyor belts. By way of example, each article is jammed and moved between two endless conveyor belts in that at least one endless conveyor belt is revolved.

Preferably, however, each article is in each case placed in a holding device. This holding device was either empty before or has already received a further article to be sorted with a sorting feature value from the same value group. An article to be sorted is placed in the holding device and transported in this holding device through the storage region and the sorting region and removed from the holding device only after leaving the sorting region. This embodiment enables a higher packing density and requires less space, in particular during transportation if the holding devices are oriented such that the route with the largest dimension of an article in this holding device is perpendicular to the transport direction of the holding devices.

The sorting feature is by way of example an identification of a destination to which an article to be sorted is to be transported, a unique identifier of an article, an identification of an attribute of the article, a physical property of the article, by way of example a size, the weight, the volume, a surface texture, color, or the flexural rigidity.

BRIEF DESCRIPTION OF THE SEVERAL VIEWS OF THE DRAWING

The invention is described below with reference to an exemplary embodiment. In the drawings.

DESCRIPTION OF THE INVENTION

Figure 1A:
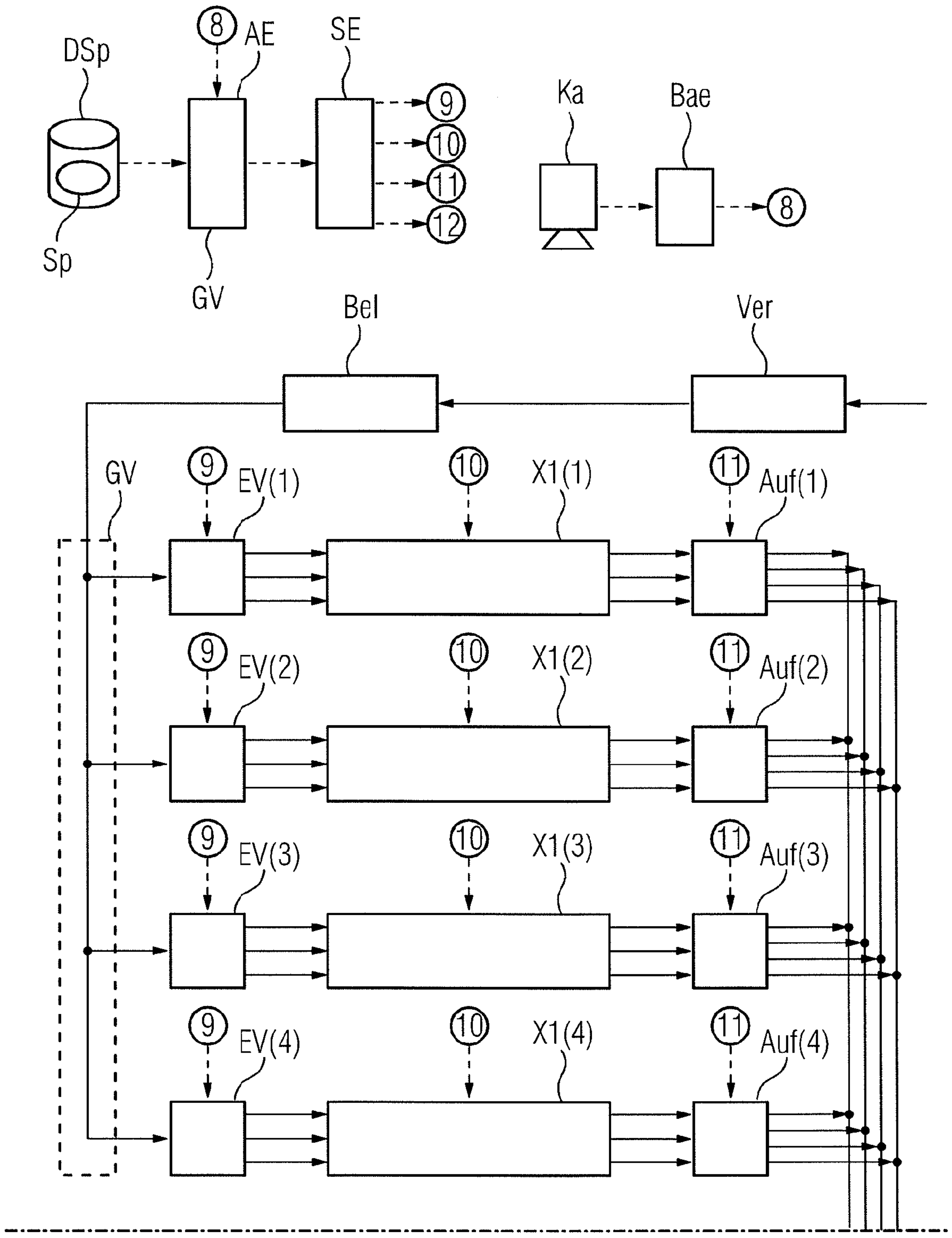
FIG. 1 (FIGS. 1A and 1B) shows the sorting system of the exemplary embodiment schematically in plan view.

In the exemplary embodiment the sorting system according to the solution is used to transport and sort items of mail (standard letters, large letters, catalogs, postcards, packages, etc.). Each item of mail extends in an article plane. Each item of mail is provided in the exemplary embodiment with either an identification of a delivery address to which the item of mail is to be transported, or the item of mail is assigned a delivery address in a different way. By way of example, the item of mail is provided with a machine-readable identifier and the identifier is linked in a data storage device with an identification of the delivery address. It is also possible for a plurality of similar and unaddressed items of mail to reach the sorting system and a computer-evaluable list of definitions of destination addresses for these items of mail to also be sent to the sorting system. During sorting the sorting systems automatically assigns each not-yet-addressed item of mail a destination address from this list and applies an identification of this assigned destination address to the item of mail.

A region of responsibility of a carrier, for example a country, is divided into w delivery regions W(l), . . . , W(w). In the exemplary embodiment the sorting system sorts items of mail for z different delivery areas of a delivery region. W(p0). Each delivery area Z(l) . . . Z(z) comprises a plurality of different destinations for items of mail in each case. Each delivery address in the delivery region belongs to exactly one destination. It is possible for different delivery addresses, for example in an apartment building, to pertain to the same destination. Each destination belongs to exactly one delivery area Z(l), . . . , Z(z).

A sequence is predetermined for the Zp(p) destinations of a delivery area Z) (p=1, . . . , z) and this assigns each destination a place cipher in this sequence. This sequence is determined for example as a function of a route plan for the route order of postal workers, wherein these postal workers transport the items of mail of a delivery area and deliver them to the delivery addresses. By way of example, each postal worker passes through one delivery route respectively in the delivery area in accordance with this route order, and each destination and each delivery area belongs to exactly one delivery route. The items of mail should be sorted such that the sequence of the delivery addresses of the sorted items of mail matches the route order of the postal worker who delivers these items of mail. This will save the postal workers from having to still sort the items of mail manually.

The sorting system according to the solution is intended to sort the items of mail for a delivery area in accordance with the sequence predetermined for the destinations of this delivery area. The sorting system should carry out this sorting process for each of the z delivery districts Z(l), . . . , Z(z) of a delivery region W(p0). The items of mail for the z delivery areas Z(l), . . . , Z(z) can reach the sorting system in a random sequence. It is possible, but not required, for individual items of mail to have already been pre-sorted before reaching the sorting system.

The items of mail for a delivery area Z(p) (p=1, . . . , z) are delivered starting from a distribution center. To make this possible within schedule, the items of mail for the delivery area Z(p) must have reached this distribution center by a specific arrival time. The transport time needed to transport the items of mail for a delivery area Z(p) from the sorting system to the apportionment center of this delivery area varies as a rule from delivery area to delivery area, for example, as a function of geographical conditions and the available means of transport. This results in one completion time respectively for each delivery area Z(p). By this completion time the sorting system must have finished sorting the items of mail for this delivery area Z(p). A time requirement for the sorting of items of mail for the z delivery areas Z(l), . . . , Z(z) results from the temporal arrangement of these completion times.

A singler ("singulator") in the sorting system used separates the items of mail which are fed to the sorting system. The items of mail leave the singulator spaced apart from one another.

In one embodiment the sorting system has a plurality of singulators operating in parallel. It is possible for any singulator to be able to separate all items of mail to be sorted. It is also possible to sort different types of items of mail in one sorting operation and to use at least one specialized singulator respectively for each type of item of mail. It is also possible for the sorting system to also have a manual feed unit for items of mail which are difficult to separate automatically.

The sorting system has a reader. Following separation this reader reads the respective delivery address identification on each item of mail. Or, the reader reads a machine-readable identifier on the item of mail and determines the stored delivery address identification in the data storage device. A measuring instrument determines the dimensions or at least one dimension of the item of mail. In one embodiment each item of mail is weighed.

At least one loading station then moves the item of mail into a previously empty storage pocket. It is possible for a plurality of loading stations to operate in parallel. The item of mail is transported in this storage pocket to a sorting exit. In the exemplary embodiment holding devices in the form of storage pockets are used therefore. Is also possible to use holding devices which each have at least one bracket ("clamp") and hold an item of mail on this clamp or clamps.

The sorting system has

- a storage region X1 with y4≥2 storage arrangements X1(1), . . . , X1(*y*4) ("storage towers") and
- a sorting region X2 with x2≥2 sorting subregions X2(1), . . . , X(x2) ("cascade towers").

The storage region X1 has an overall pre-sorter GV. Each storage arrangement X1(*i*) (i =1, . . . , y4) respectively has

- an individual item pre-sorter EV(i) and
- an apportioning device Auf(i).

Each sorting subregion X2(*k*) (k=1, . . . , x2) respectively comprises

- a feed transport path Tpf(k) and
- a cascade sorter with the two stages X3(*k*) and X4(*k*)

An unloading station E(k) is arranged downstream of the exit of each sorting subregion X2(*k*) in each case.

In the exemplary embodiment y4=4 and x2=4

In the following a configuration of the sorting system is described in which all x1 storage subregions and all x2 sorting subregions are used. The sorting system of the exemplary embodiment may also be operated in a different configuration in which at least one storage subregion or at least one sorting subregion is not used for this sorting task. The sorting system according to the solution can be changed over to a different configuration simply by modifying the sorting plan accordingly. In the exemplary embodiment each storage arrangement X1(*i*) (i=1, . . . , y4) has one individual item pre-sorter EV(i) and y3 storage subregions X1(*i, l*), . . . X1(*i, y*3) respectively. In total the storage region X1 therefore has x1=y4*y3 storage subregions X1(1, 1), . . . , X1(*l, y*3), . . . , X1(*y*4, l), . . . , X1(*y*4, y3). The storage subregion X1(*i, j*) belongs to the storage arrangement X1(*i*) (i=1, . . . , y4; j=1, . . . , y3). In the exemplary embodiment y3=9, i.e. x1=4*9=36. It is also possible for a first storage arrangement X1(*i*) to have more storage subregions than a second storage arrangement X1(*j*).

The sorting system is designed such that x1*x2=y4*y3*y2≤z.

The y3 storage subregions X1(*i, l*), . . . , X1(*i, y*3) of a storage arrangement X1(*i*) (i=1, . . . , y4) are provided. one above the other in the exemplary embodiment. In the exemplary embodiment each storage subregion X1(*i, j*) has y1 storage lines respectively. The y1 storage lines of a storage subregion. X1(*l, j*) are arranged. side by side. These y1 storage lines, can all lie in the same plane or may be offset in height relative to each other. Storage pockets with items of mail are transported along each storage line. It is also possible for a first storage subregion X1(*i*1, j1) to have more storage lines than a second storage subregion X1(*i*2, j2). Each storage subregion X1(*i, j*) is preferably designed such that y1≤x2.

By way of example, y1=3, i.e. each storage subregion X1(*i, j*) has three parallel storage lines. In the event of congestion or the like a worker can then still easily grip storage pockets in the middle storage line from the outside without an outer storage line impeding access to the middle storage line, and, more precisely, such that the intervention depth is sufficiently small for an adult worker.

In one embodiment each storage line is designed as a straight section. It is also possible, however, for a storage line—or even all storage lines—to include at least one straight section and at least one curved section. The storage lines can consequently adjust to the available space. By way of example, each storage line consists of two straight sections and one curved segment respectively, and this is located between the straight sections. Each storage subregion is preferably designed such that an article to be sorted is held in the same storage line throughout its entire stay in this storage subregion, i.e. is not transported from one storage line to another storage line. This saves gates and transverse paths between storage lines and reduces the number of entrances and exits in the storage subregion. The storage subregion preferably has as many inputs, and outputs as storage lines.

The only exit of the loading device Bel leads, to the entrance of the overall pre-sorter GV. It is also possible for a plurality of loading devices to operate in parallel and the exit of each loading device to lead to the entrance of the overall pre-sorter GV. Each of the y4 exits of the overall pre-sorter GV is connected to one entrance of a storage arrangement. X1(*i*) respectively. The overall pre-sorter GV apportions the incoming holding devices to the y4 storage arrangements. The individual item pre-sorter EV(i) of the storage arrangement X1(*i*) apportions the holding devices with items of mail to the y3 storage subregions X1(*i, l*), . . . , X1(*i, y*3) of this storage arrangement X1(*i*). The individual item pre-sorter EV(i) has an entrance connected to the corresponding exit of the overall pre-sorter GV. In one embodiment the individual item pre-sorter EV(i) has one respective exit per storage subregion (X1 *i, j*) of the storage arrangement X1(*i*), a total of y3 exits therefore. In another embodiment the individual item pre-sorter EV(i) has one respective exit per storage line of the storage arrangement X1(*i*), a total of y3*y1 outputs therefore.

Each storage arrangement X1(*i*) has one apportioning device Auf(i) respectively. This apportioning device Auf(i) is connected to each storage line of the storage arrangement X1(*i*) and arranged downstream of the storage lines. Because the storage arrangement X1(*i*) has y3 storage subregions, and each storage subregion X1(*i, j*) has y1 storage lines respectively, the apportioning device Auf(i) has y3*y1 entrances, namely one entrance per storage line of the storage arrangement X1(1) respectively.

The apportioning device Auf(i) is designed to apportion the incoming items of mail to the x2 sorting subregions. Each apportioning device Auf(i) therefore has x2 exits, namely one exit per sorting subregion X2(*k*) (k=1, . . . , x2) respectively. The feed transport path Tpf(k) of the sorting subregion X2(*k*) begins in the associated exit of the apportioning device Auf(i).

Figure 1B:
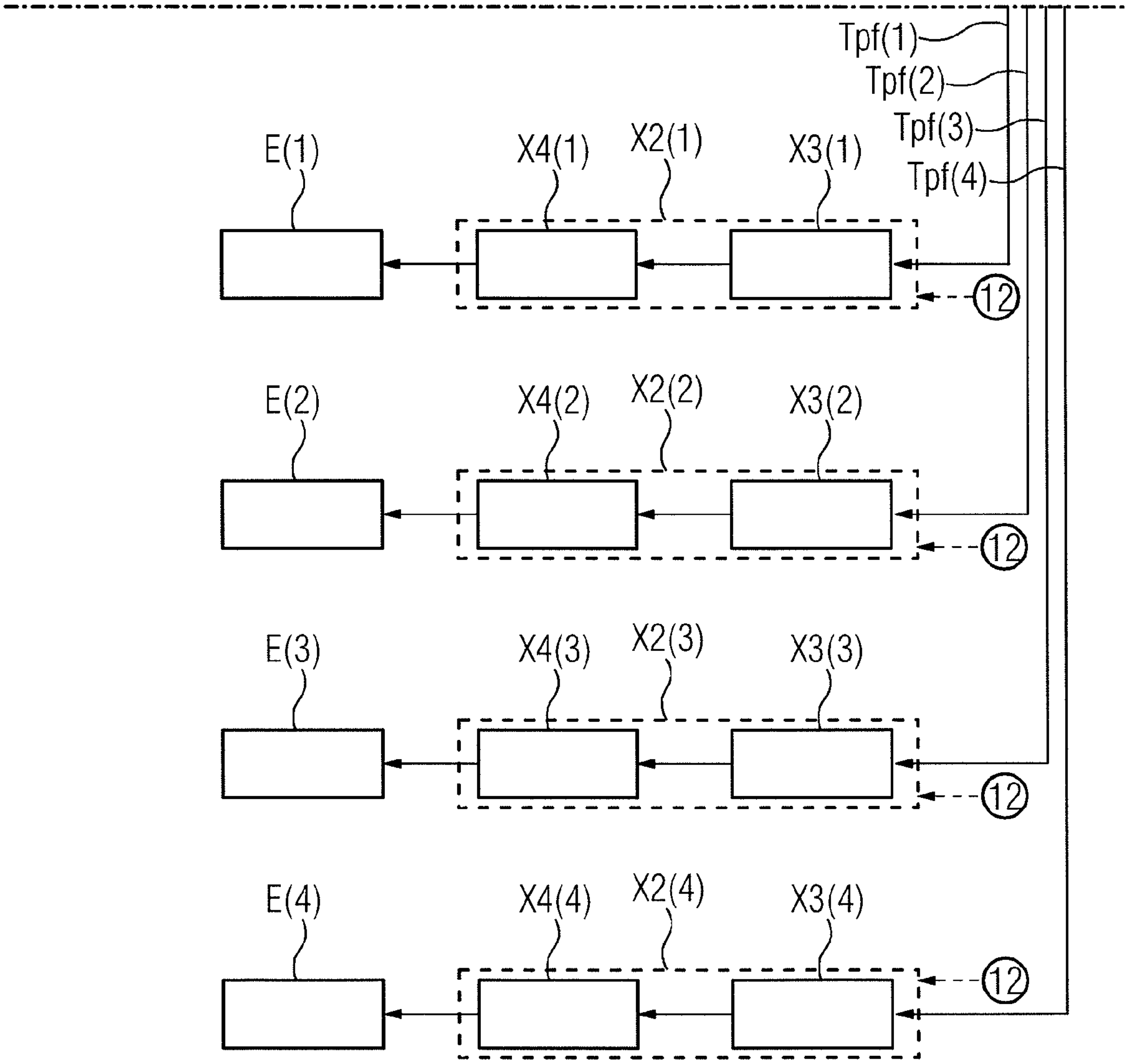

FIG. 1 schematically shows the sorting system of the exemplary embodiment in a plan view. This sorting system comprises the following components:

- a singulator Ver,
- a camera Ka,
- an image evaluation unit Bae,
- a selection unit AE,
- a data storage device DSp with a computer-evaluable sorting plan Sp,
- a control unit SE,
- a loading station,
- an overall pre-sorter DV,
- y4=4 storage arrangements X1(1), . . . , X1(4);
- for each storage arrangement X1(*i*) (i=1, . . . , 4) one individual item pre-sorter EV(i) and one apportioning device Auf(i) respectively,
- x2=4 sorting subregions X2(1), . . . , X2(4),
- for each sorting subregion X2(1), . . . , X2(4) one feed transport path Tpf(1), . . . , Tpf(4) respectively and
- downstream of each storage subregion X2(1), . . . , X2(4) one unloading station E(1), . . . , E(4) respectively.

Solid arrows indicate flows of material, i.e. the flow of items of mail through this sorting system. Broken arrows represent data flows.

The singulator Ver separates the items of mail, so a flow of items of mail which are spaced apart leaves the singulator Ver in an upright position. The camera Ka produces one computer-accessible image respectively of each item of mail. The image evaluation unit Bae evaluates this computer-accessible image and deciphers the delivery address in this image. The selection unit AE selects, as a function of the deciphering result, of the image evaluation unit Bae for each item of mail, one storage arrangement X1(*i*) and one storage subregion X1(*i, j*) respectively of this storage arrangement X1(*i*) and one sorting subregion X2(*k*) respectively. The control unit SE controls the components of the sorting system. In particular the control device SE controls the transport devices of the sorting system such that each item of mail is transported into the selected storage subregion X1(*i, j*) and the selected sorting subregion X2(*k*).

The loading station. Bel moves each item of mail into one holding device respectively, and this is described in more detail below. The holding devices with the items of mail are apportioned by a single overall pre-sorter GV to the y4=4 storage arrangements X1(1), . . . , X1(4). In the unloading station E(k) of a sorting subregion. X2(*k*) (k=1, . . . , x2) an item. of mail is removed from the respective holding device.

In the exemplary embodiment each item of mail is moved from the loading station Bel into a previously empty storage pocket ("pocket"), once

- this item of mail has been separated,
- a computer-accessible image of the item. of mail has been generated and
- the item of mail has been measured and/or weighed in one embodiment.

This storage pocket acts as a holding device for an item of mail transported in an upright position.

The item of mail remains in this storage pocket until the item in the storage pocket has left the cascade sorter. A different holding device, for example an arrangement with at least one clamp, can also be used instead of a storage pocket.

In one embodiment the storage pocket has two side surfaces which are mechanically connected to each other, and a fastening element, for example in the form of a hook, in order to allow the storage pocket to slide in a rail and be able to the transport the storage pocket in the rail. An upright item of mail is laterally inserted into the storage pocket and between the side surfaces. In one embodiment the item. of mail is pulled to the side or upwards out of the storage pocket again. In a further embodiment the item of mail slides downwards through an opening in the storage pocket and out of the storage pocket.

Figure 2:
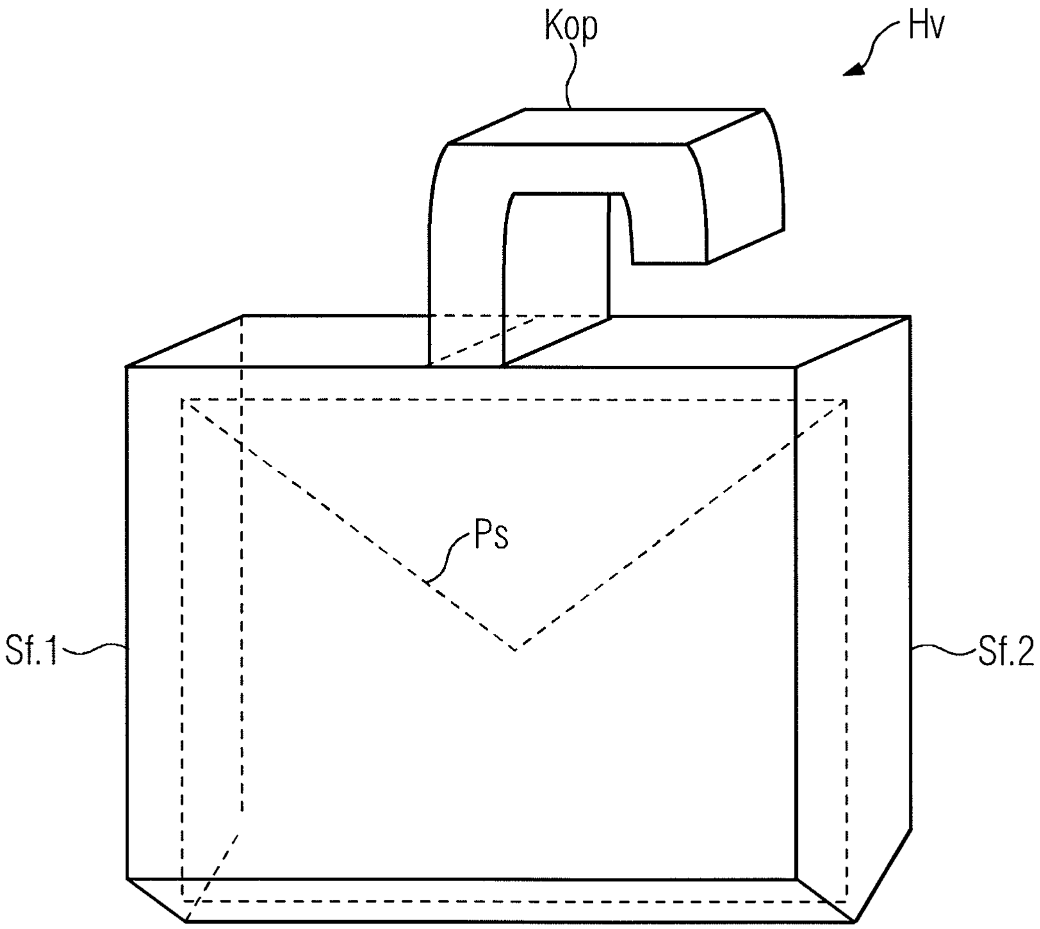
FIG. 2 shows a storage pocket in which an item of mail to be sorted is transported through the sorting system of FIG. 1.

FIG. 2 shows by way of example a storage pocket for a flat item of mail Ps. This storage pocket acts as a holding device Hv. The storage pocket comprises two side surfaces Sf.1, Sf.2 which are mechanically connected to each other. The base of the storage pocket dv preferably forms a V so the upright item of mail rests securely in the storage pocket. The article-level of the item of mail Ps and the planes of the two side surfaces Sf.1, Sf.2 are all arranged in parallel to each other. In the example of FIG. 2 the storage pocket uv has a single coupling element Kop in the form. of a hook. This coupling element is provided in such a way that it is located approximately above the center of gravity of an article in the storage pocket Hv. The storage pocket is hooked by this one coupling element Kop in a guide and transport device. This guide and transport device includes, by way of example, a rail and transports the suspended storage pocket. Hr with the item of mail Ps along a conveyor which leads through. the storage region X1 and sorting region X2.

Each storage pocket is provided with a unique machine-readable identifier. During sorting a computer-accessible allocation table is continually updated. For each identifier of a storage pocket the destination to which that item of mail which is currently in the storage pocket is to be transported is stored in this allocation table. Once the identifier of the storage pocket has been read and the stored destination of the item of mail in the storage pocket has been determined, transportation of the storage pocket is controlled as a function of the determined destination of the item of mail.

Each storage line is filled from a storage line entrance with filled storage pockets, so a sequence of filled storage pockets results in the storage line. Each storage line extends in a longitudinal direction. All of the longitudinal directions are preferably parallel to each other and the filled storage pockets in a storage line are approximately perpendicular to the longitudinal direction of this storage line.

The sorting system is able to process items of mail with different dimensions. To make this possible, without wasting space, the sorting system in the exemplary embodiment has storage pockets of different sizes. y2 different types of storage pocket are distinguished. If y2=2 then there is a larger storage pocket and a smaller pocket. The larger storage pocket is preferably higher and exactly as wide as the smaller storage pocket.

Each storage line is capable of receiving a plurality of storage pockets of one storage pocket type respectively and is tailored to storage pockets of this one storage pocket type. In one embodiment those storage lines which are tailored to storage pockets of one type are also able to receive storage pockets of a different type, e.g. smaller storage pockets.

As just stated, in the exemplary embodiment the in each case y1 storage lines of each storage subregion X1(*i, j*) extend in a storage arrangement X1(*i*) (i=1, . . . , y4) in mutually parallel longitudinal directions. In a plane perpendicular to these longitudinal directions each storage line assumes an approximately rectangular area. This rectangular area defines a storage pocket in the storage line, wherein the storage pocket is approximately perpendicular to the longitudinal direction of the storage line. Each storage arrangement X1(*i*) (i=1, . . . , y4) has y3 storage subregions each with y1 storage lines. Therefore, y3 x y1 rectangles are arranged in this perpendicular plane for the storage lines. In the exemplary embodiment y2=2 different types of storage pocket are used. The dimensions and weight of an item of mail determine into which storage pocket an item of mail is moved.

If y2=2 and there are N1 storage lines for storage pockets of the first storage pocket type and N2 storage lines for storage pockets of the second storage pocket type, then N1+N2=y3 x y1. The ratio of items of mail with different dimensions to each other determines the ratio Na to Nz. By way of example, N1 to N2=2:1, wherein the first storage pocket type is half as high as the second storage pocket type and the same width. The rectangles for storage lines are arranged in the plane such that the available space in the plane is nearly optimally utilized.

Figure 3:
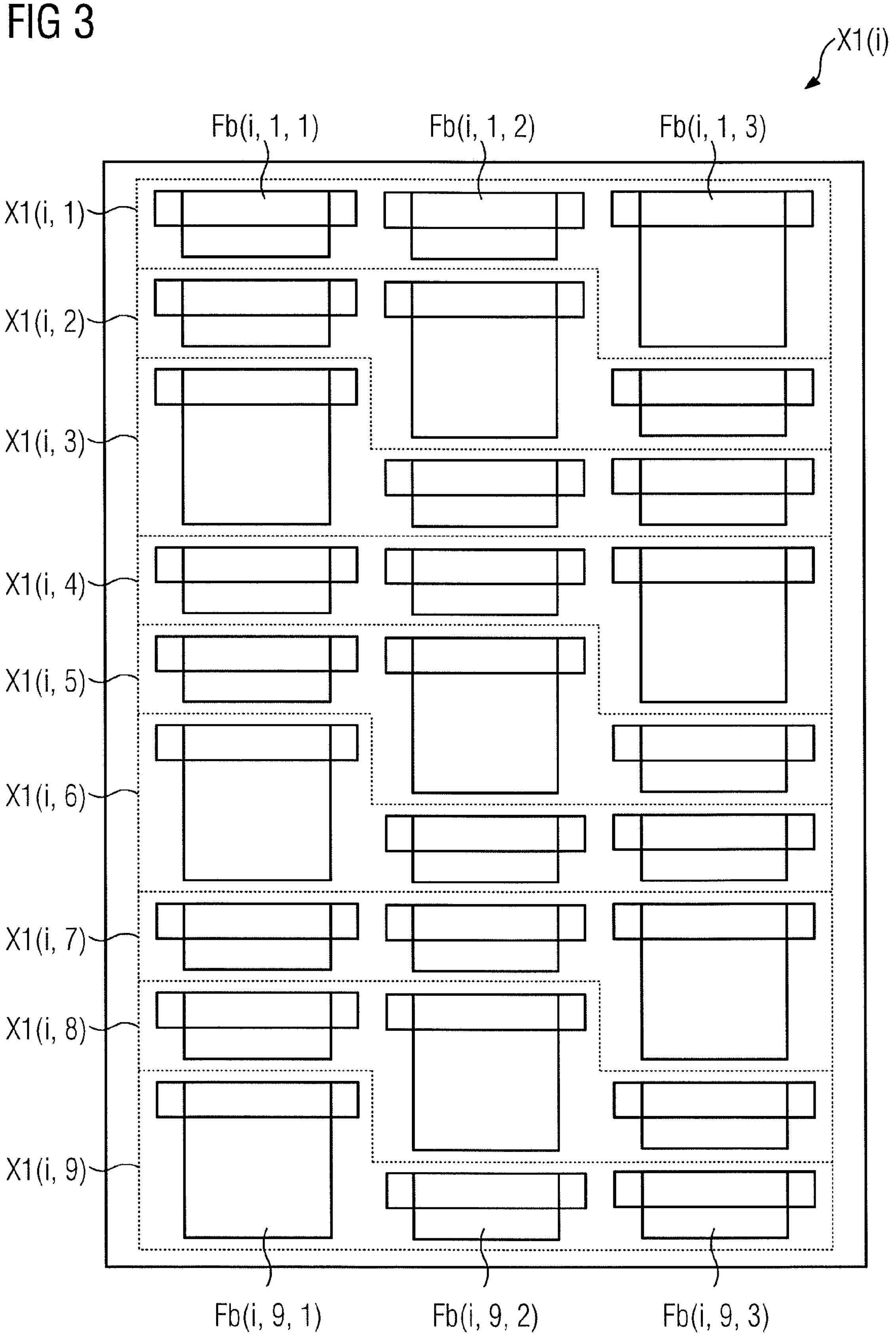
FIG. 3 shows a storage arrangement with 9*3 storage lines in a sectional plane perpendicular to the transport directions of the storage lines.

FIG. 3 shows by way of example the storage arrangement X1(*i*), wheren the sectional plane lying in the drawing plane of FIG. 3 is perpendicular to the transport directions in which the storage lines of the storage arrangement X1(*i*) transport holding devices with items of mail. This storage arrangement X1(*i*), has y4=9 storage subregions X1(*i, l*), . . . , X1(*i*, 9) located one above the other. Each storage subregion consists of y1=3 adjacent storage lines. The longitudinal directions of these storage lines are all perpendicular to the drawing plane of FIG. 3. The top storage subregion X1(*i, l*) has three adjacent storage lines Fb(i, 1, 1), Fb(i, 1, 2), Fb(i. 1, 3) in the form of conveyors. The bottom storage subregion X1(*i*, 9) also has three adjacent storage lines Fb(i, 9, 1), Fb (i, 9, 2), Fb (i, 9, 3). Every other storage subregion X1(*i, j*) also has three adjacent storage lines.

In the example of FIG. 3 each holding device has two laterally provided coupling elements which are only indicated in FIG. 3. With the aid of these two lateral coupling elements this holding device is connected to the guide and transportation device. The holding device slides on two parallel rails by way of example.

In the example of FIG. 3 there are y2=2 different types of storage pocket, namely a low storage pocket and a high storage pocket. Each storage subregion X1(*i, j*) has two storage lines for low storage pockets and one storage line for high storage pockets. In total the storage subregion. X1(*i, j*) shown in FIG. 3 therefore has 18 storage lines for low storage pockets and 9 storage lines for high storage pockets. In FIG. 3 it can be seen that the storage lines are arranged such that the rectangular space available in the sectional plane is optimally utilized.

In storage region X1 pre-sorting to the x1 storage subregions and therefore to x1=y4*y3 different groups of sorting destinations is carried out. This pre-sorting is undertaken by the overall pre-sorter GV and y4 individual item pre-sorters EV(1), . . . , EV(y4). A selection unit in the sorting system selects one storage arrangement and one storage subregion of the selected storage arrangement respectively for each item of mail. For this the selection unit uses the previously read delivery address of the item of mail and a predetermined computer-accessible sorting plan. In addition, the selection unit selects a storage pocket type which is large enough for this item of mail. For this the selection unit uses at least one previously measured dimension of the item of mail. The selection unit selects a storage line of the previously selected storage subregion which is able to receive the storage pockets of this selected storage pocket type.

The individual item pre-sorter EV(i) of the storage arrangement X1(*i*) apportions the holding devices of the items of mail, which have been transported to this storage arrangement X1(*i*), to the y3 storage subregions of this storage arrangement X1(*i*) The apportioning device Auf(i) apportions the items of mail from the storage arrangement X1(*i*) to the x2 feed transport paths Tpf(1), . . . , Tpf(x2) to the x2 sorting subregions X2(1), . . . , X2(x2) The incoming holding devices with items of mail are sorted. in each sorting subregion X2(*a*) according to route order. In one embodiment the sorted holding devices of the sorting subregion X2(*k*) are transported to the discharge station E(k).

Depending on a selection unit AE, the control unit SE controls the overall pre-sorter GV and the y4 individual item pre-sorters EV(1), . . . , EV(y4) in such a way that each holding device is transported into the respectively selected storage line.

In the exemplary embodiment each storage line works in accordance with the "first in/first out" (FIFO) principle. Operation in accordance with the "last in/first out" (LIFO) principle is also possible, but then each storage arrangement on the same side must have an exit in addition to the entrance, or a storage arrangement X1(1), . . . , X1(*y*1) has a component which acts as both an entrance and an exit.

Downstream of the storage region X1 is arranged a sorting region X2 with x2 sorting subregions. The holding devices with the items of mail are transported from the storage region X1 into the sorting region. X2. For this purpose the apportioning device Auf(i), described below, of a storage device X1(*i*) is used.

In the exemplary embodiment the y storage subregions X1(*i, l*), X1(*i*, 3) of a storage arrangement X1(*i*) are arranged one above the other. The y1 storage lines of a storage subregion X1(*i, j*) are arranged. side by side. The apportioning device Auf(i) of the storage arrangement X1(*i*) has a branch region Abzw(i) and y3*y1 connection paths to this branch region. Each connection. path. begins in an exit of a storage line of the storage arrangement X1(*i*) and leads to the branch region Abzw(i). The branch region Abzw(i) is connected by x2 cross connections with the x2 feed transport paths Tpf(1), . . . , Tpf(x2) to the x2 sorting subregions.

Figure 4:
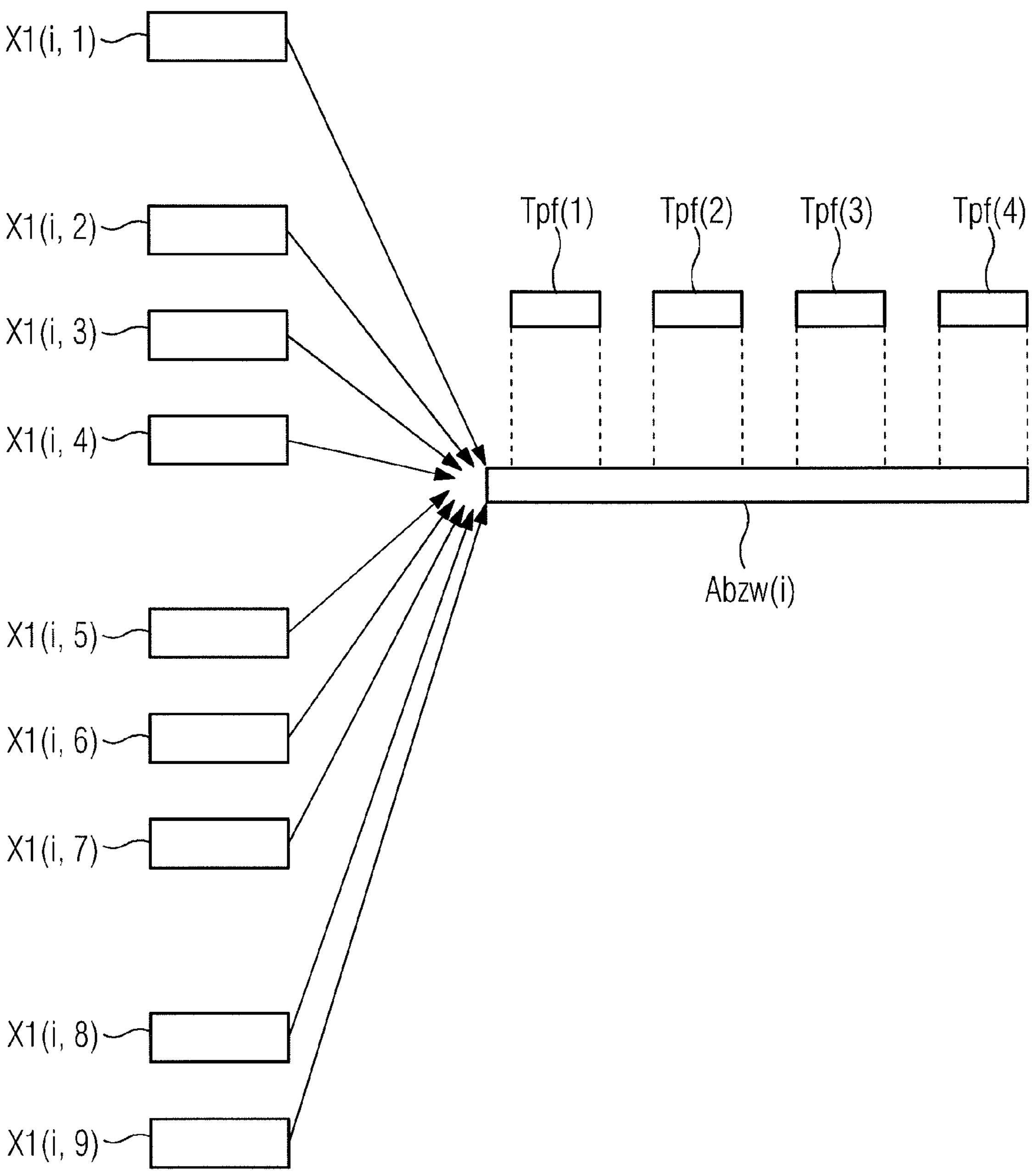
FIG. 4 shows an apportioning device downstream of a storage arrangement.

FIG. 4 schematically shows the apportioning device Auf(i) of the storage arrangement X1(*i*) (i=y4). The left of FIG. 4 schematically shows one storage line respectively of a storage subregion X1(*i, l*), . . . , X1(*i, y*3) of the storage arrangement X1(*i*) where y3=9. The longitudinal directions of these y3−9 storage lines located one above the other lie in the drawing plane of FIG. 4 and are perpendicular to the drawing plane of FIG. 3. In FIG. 4 those y3=9 storage lines are shown which are arranged in the right-hand column in FIG. 3. The likewise y3=9 storage lines of the middle column of FIG. 3 are located in a plane parallel to the drawing plane of FIG. 4. The y3=9 storage lines of the left-hand column are located in another parallel plane. The holding devices with items of mail are transported in the illustration of FIG. 4 from left to right up to the end, illustrated in FIG. 4, of a storage line.

From each storage line of each storage subregion X1(*i, l*), . . . , X1(*i*, 9) there leads a connection path to the branch region Abzw(i). The holding devices in this branch region Abzw(i) may therefore be transported from each storage line of the storage arrangment X1(*i*). The y2=4 feed transport paths Tpf(1), . . . , Tbf(4) run in a longitudinal direction which is perpendicular to the drawing plane of FIG. 4. The branch region Abzw(i) is located perpendicularly below these transport paths. A holding device is transported out of a storage line into the branch region Abzw(i) and is deflected from there via a cross-connection into the respectively selected feed transport path Tpf(k). This holding device is transported obliquely upwards from the branch region Abzw into the entrance of the feed transport path Tpf(k) and transported on this feed transport path Tpf(k) to the selected sorting region X2(*k*).

In one embodiment all x2 sorting subregions X2(1), . . . , X2(*x*2) are provided in one plane, in another embodiment one above the other in a plurality of planes. It is also prossible for the x2 sorting subregions to b apportioned to x2.1 planes, wherein x2.2 sorting subregions are arranged in each plane and x2.1* x2.2=x2. This embodiment is implemented in the exemplary embodiment, and x2.1=x2.2=2.

Each sorting subregion X2(*k*) comprises a feed transport path Tpf(k), a first. sorting stage X3(*k*) and a second. sorting stage X4(*k*)

of a two-stage cascade sorter (k=1, . . . , x2).

The feed transport path Tpf(k) connects the storage lines of the storage region X1 to the first stage X3(*k*) of that sorting subregion X2(*k*) to which the feed transport path Tpf(k) and the first sorting stage X3(*k*) belong. The feed transport path. Tpf(k), the first sorting stage X3(*k*) and the second. sorting stage X4(*k*) of a sorting subregion X3(*k*) are connected behind one another in a row. The x2 sorting subregions X2(1), . . . , X2(*x*2) and therefore the x2 feed. transport paths Tpf(1), . . . , Tpf(x2) are arranged such that they operate in parallel.

In one embodiment each feed transport. path. Tpf(k) extends in a longitudinal direction. The feed transport paths T f(1), . . . , Tpf(x2) run parallel to each other. The storage lines also run parallel to each other. The x2 feed transport paths Tpf(1), . . . , Tpf(x2) are perpendicular to the storage lines.

In one embodiment each storage line is connected. directly to each feed transport path. Each storage line has x2 outputs leading to the x2 feed transport paths. Each feed transport path has one entry site per storage line. With y3*y4 storage subregions and y1 storage lines per storage subregion, storage region X1 has a total of y1*y3*y4 entry sites.

In a further embodiment each storage line is connected by one connection path respectively to each feed transport path. In this further embodiment there are a total of y1*x2*y3*y4 connection paths. In the preferred embodiment each storage arrangement X1(*i*) has the above-descrq)ed apportioning device Auf(i) with y3 y1 entrances and x2 exits.

In one embodiment the items of mail are moved into storage pockets and transported in these storage pockets, wherein different types of storage pocket are differentiated. In the exemplary embodiment each sorting subregion. X2(1), . . . , X2(*x*2) has only one feed transport path Tpf(1), . . . , Tpf(x2). Therefore, each sorting subregion X2(*k*) is designed such that the feed transport path Tpf(k) and the two sorting stages X3(*k*), X4(*k*) sorting subregion. X2(*k*) are able to receive any type of storage pocket.

As already stated, the item of mail is moved. into a previously empty storage pocket, and, more precisely, once its delivery address has been read and its dimensions measured. The storage pocket with the item of mail is transported to the feed transport path. Tpf(k) of the previously selected storage line and temporarily stored in this storage line.

In a first phase, which preferably lasts several hours, all items of mail to be sorted and which have reached the sorting system by a predetermined time, are moved into storage pockets and apportioned to the storage lines of the x1 storage subregions of storage region X1. After the end of this phase ("cut-off time"), the items of mail are moved from the storage region X1 into sorting region X2. When this first phase ends and when emptying of storage region. X1 begins depends on the earliest predetermined completion time for the z delivery areas.

In the exemplary embodiment a computer-accessible sorting plan for storage assigns each storage subregion X1(*i, j*) the delivery addresses of x2 delivery areas respectively.

Therefore, items of mail for a maximum of x2 different delivery areas are in each case located in each storage subregion X1(*i*, *j*). Each delivery area comprises several destinations. These x2 volumes of items of majl for x2 delivery areas shall now be distributed among the x2 sorting subregions X2(1), . . . , X2(*x*2). This distribution is carried out consecutively for each storage subregion X1(*i*, *j*) of the storage region X1. The computer-accessible sorting plan also assigns one sorting subregion respectively to each delivery area (i.e. all delivery addresses of this delivery area). As the number z of delivery areas is much larger than the number x2 of sorting subregions, the sorting plan assigns the same sorting subregion. respectively to several delivery areas.

After completion of the first phase items of mail for a maximum. of x2 different delivery areas are therefore located in storage subregion X1(*i*, *j*). The items of mail of a storage subregion X1(*i*, *j*) are apportioned to the y1 storage lines of this storage subregion X1(*i*, *j*) in a manner which cannot be predicted with certainty. The sequence of the items of mail in a storage line cannot be predicted either. The invention does not require any prior knowledge about a sequence or apportionment either.

Each storage line of the storage subregion X1(*i*, *j*) is connected to each feed transport path Tpf(1), . . . , Tpf(x2). The storage pockets with the items of mail in this storage line are apportioned to the x2 feed transport path Tpf(1), . . . , Tpf(x2). For this purpose the computer-accessible sorting plan is evaluated. which assigns exactly one sorting subregion X2(*k*) respectively and therefore exactly one feed transport. path. Tpf(k) of this assigned sorting subregion X2(*k*) to each delivery area and therefore each storage pocket with an item of mail as well. The storage pockets with the items of mail in the storage line are consecutively transported from the storage lines into the respectively assigned feed transport path Tpf(k). The storage pockets are apportioned to the feed transport paths hereby. It is not necessary for one storage pocket to overtake another storage pocket.

The distances between. the filled storage pockets and the transportation speed. in a storage line are dimensioned such that each storage pocket can be transported independently of any other storage pocket from the storage line into the assigned feed transport path. Tpf(k). It is not necessary to transport a storage pocket back into a storage line on a closed transport path. Furthermore, it is not necessary to move a storage pocket from one storage line into another storage line or from one feed transport path into another feed transport path.

The step of emptying all storage lines of a storage subregion is carried out firstly for a first storage subregion X1(*i*1, j1), wherein the items of mail from this first storage subregion are apportioned to the maximum of x2 sorting subregions X2(1), . . . , X2(*x*2) This step is subsequently carried out for a second. storage subregion X1(*i*2, j2), then for a third storage subregion X1(*i*3, j3), etc. Each time the same x2 feed transport paths of the same sorting subregion X2 are used.

In one embodiment firstly all y3 storage subregions X1(1, 1), then X1(1, 2), . . . , then X1(1, y3) of a first storage device X1(1) are consecutively emptied, then all y3 storage subregions X1 (2, 1), X1(2, y3), . . . , of a second storage device X1(2) and so on. In a further embodiment firstly the first storage subregions X1(1, 1), then X1(2, 1), . . . , then X1(*y*4, 1) are emptied, then the second. storage subregions X1(2, 1), . . . , X1(2, y3) and so on.

In one embodiment firstly a first. storage line of the storage subregion X1(*i*, *j*) is completely emptied, then a second storage line of the same storage subregion X1(*i*, *j*) is completely and so on. In a preferred embodiment all storage lines, of a storage subregion X1(*i*, *j*) are emptied in parallel, or at least so as to overlap time-wise by way of the same merging region. In this preferred embodiment y1≤x2, i.e. each storage subregion. X1(*l* *j*) has fewer storage lines than the sorting region. X2 sorting subregions. This firstly causes items of mail from y1 storage lines to be apportioned to x2 feed transport paths where x2>y1 and items of mail from different storage subregions to pass consecutively into the same feed transport path Tpf k). In both embodiments first all y1 storage lines of a first storage subregion X1(*i*, *j*) are emptied and thereafter all y1 storage lines of a second storage subregion X1(*i*2, j2). This prevents items of mail from different storage subregions from being mixed during unloading.

As stated above, in storage region X1 the items of mail are apportioned to x1=y4*y3 different groups of sorting destinations since the storage region X1 has x1 different storage subregions. The items of mail in a group are not yet themselves sorted, but are still arranged in the same storage subregion X1(*i*, *j*) as a function. of their arrival times.

First, the items of mail of a first group of sorting destinations are transported from a first storage subregion X1(*i*1, j1) into the sorting region X2 and then apportioned to the x2 different sorting subregions X2(*k*) This is done in that the items of mail of the group are apportioned to the x2 feed transport paths Tpf(1), . . . , Tpf(x2). A volume of items of mail consequently forms in each sorting subregion X2(*k*) This volume passes through the sorting subregion X2(*k*) and is transported on the feed transport path Tpf(k) to the first stage X3(*k*) of the cascade sorter, described below, of the selected sorting subregion X2(*k*). An item of mail which does not belong to this volume is prevented from being fed into this volume. The items of mail of a first volume consequently consecutively reach the cascade sorter X3(*k*), X4(*k*) without another item of mail being pushed in between and reaching the cascade sorter in between.

Only when all items of mail from the first storage subregion X1(*i*1, j1) have been apportioned to the x2 feed transport paths Tpf(1), . . . , Tpf(x2) x2 sorting subregions is the apportionment of a second storage subregion. X1(*i*2, j2) to the same x2 sorting subregions begun. This clocking prevents items of mail from different volumes from being mixed. Instead, x1 volumes of items of mail respectively consecutively pass through each sorting subregion X2(*k*) Each volume passes through exactly one sorting subregion X2(*k*) here. Mixing of items of mail is prevented even during transportation of these volumes from one feed transport path Tpf(k) to the first stage X3(*k*) of the associated sorting subregon X2(*k*) This is achieved in that firstly all items of mail of a first volume from a first storage subregion are apportioned to the X2 feed transport paths Tpf(1), . . . , Tpf(x2), then all items of mail of a second volume from a storage subregion, and so one The x feed transport. paths Tpf(1), . . . , Tpf(x2) run parallel and preferably do not intersect.

Because the storage subregions have carried out pre-sorting and are emptied consecutively, it is possible to operate each storage line in accordance with the FIFO ("first in/first out") principle, and this allows a simple mechanical design. It is not necessary to shift a storage pocket from one storage line to another storage line or to move it in some other way. Likewise it is not necessary for one storage pocket to overtake another storage pocket on a storage line. It also prevents a reversal during transportation of the filled storage pockets. Instead, the storage pockets are always transported in the same direction. It is also possible to operate each. storage line or even lust a few storage lines in accordance with the LIFO ("last in/first out") principle. The same applies to the x2 feed transport paths Tpf(1), . . . , Tpf(x2) of the sorting region X2.

As stated above, the sorting system should sort items of mail for z delivery areas Z(l), . . . , Z(z) according to z predetermined sequences of the destinations of one delivery area respectively. Timing constraints are predetermined as to when sorting of these items of mail is to be completed. As lust described, a first volume of items of mail first reaches a cascade sorter X3(*k*1), X4(*k*) of a sorting subregion X2(*k*), then a second volume reaches a cascade sorter X3(*k*2), X4(*k*2) and so on. The x2 cascade sorters of the x2 sorting subregions are arranged parallel and preferably also operate simultaneously. The sorting system sorts in such a way that the first volume of items of mail consists of the items of mail for the first delivery area and no further items of mail; the second. volume of exactly the items of mail for the second delivery area and so on. Each such volume comes from a feed transport path Tpf(k). Because the storage region X1 has x1 different storage subregions and the downstream. sorting region X2 has x2 different sorting subregions, the sorting method described. above, which is executed by storage region X1 and by apportionment to x2 different feed transport paths Tpf(1), . . . , Tpf (x2), causes the items of mail to be apportioned to x1*x2 different volumes and each of these x1*x2 different volumes then reach. each one cascade sorter respectively. Mixing of these volumes is avoided. The sorting method according to the solution allows the x2 cascade sorter to sort the x1*x2 volumes of items of mail. The sorting system is designed such that x1*x2≥z. The x2 cascade sorters preferably operate simultaneously or at least so as to overlap time-wise.

Each such volume of items of mail, i.e. the items of mail for a delivery area Z(p), is consecutively sorted by means of the cascade sorter of the sorting subregion. X2(*k*) having a first sorting cascade stage X3(*k*) and a second sorting cascade stage X4(*k*). Each cascade sorter sorts the items of mail for a first delivery area in accordance with the predetermined sequence of the destinations of this first delivery area. Thereafter the same cascade sorter sorts the items of mail for a second. delivery area in accordance with sequence predetermined for this second delivery area, and so on.

Each sorting cascade stage X3(*k*), X4(*k*) has in each case - an entrance and an exit,

- a feed transport path which begins in the entrance,
- a sequence of x3 or x4 temporary stores and
- at least one out-feed feed transport path which leads to the exit.

The feed transport path of the first cascade stage X3(*k*) is designed. as a section of the feed transport. path. Tpf(k) of the sorting subregion X2(*k*). The entrance to the first sorting cascade stage X3(*k*) is in the feed transport path Tpf(k).

Each sorting cascade stage X3(*k*), X4(*k*) also has per temporary store respectively

- a gate in the feed transport path,
- an entry site in the out-feed transport path,
- a feed connection path from the gate to the temporary store and
- an out-feed path from the temporary store to the entry site in the out-feed transport path.

Because the last section of the feed. transport path Tpf(k) already belongs to the first sorting cascade stage X3(*k*), items of mail pass from the feed transport path Tpf(k) directly into the first sorting cascade stage X3(*k*). The exit of the first sorting stage cascade X3(*k*) is connected to the entrance of the second cascade sorting stage X4(*k*).

Because the first cascade stage is X3(*k*) has x3 temporary stores and the second cascade stage XE(k) has x4 temporary stores, any two-stage cascade sorter X3(*k*), X4(*k*) is able to sort items of mail different to a predetermined sequence of a maximum of x3*x4 different destinations. Therefore, the cascade sorter X3(*k*) X4(*k*) is designed such that x3*x4≥Zp(p) (for p=1, . . . , z). Then the same cascade sorter is able to consecutively sort the items of mail of each delivery area in accordance with the predetermined sequence. In the exemplary embodiment all first cascade stages X3(1), . . . , X3(*x*2) have x3 temporary stores in each case, and all the second cascade stages X4(1), . . . , X4(*x*2) have x4 temporary stores in each case. In is also possible for the first cascade stages, and/or the second. cascade stages to have different numbers of temporary stores.

Figure 5:
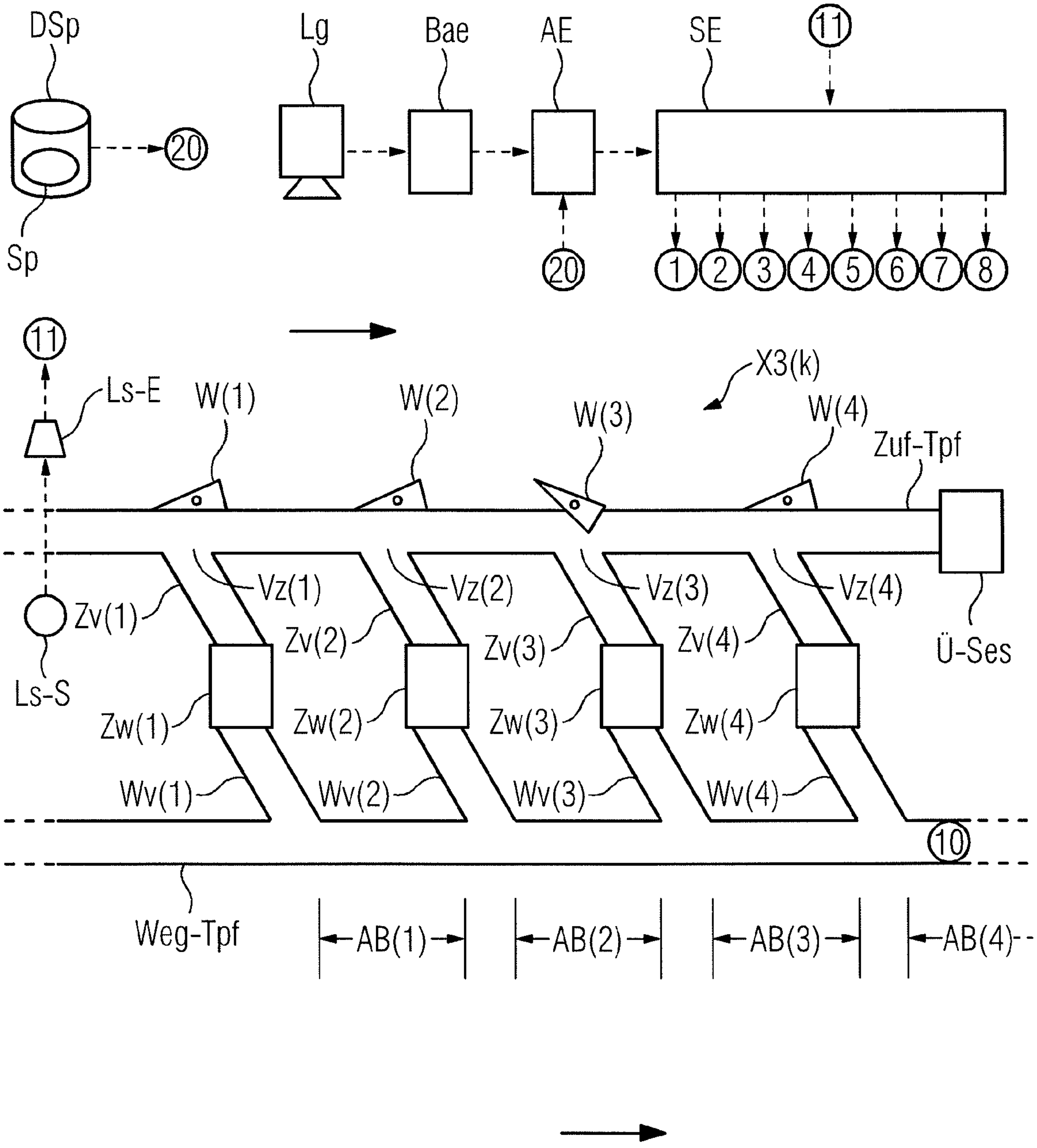
FIG. 5 shows a first embodiment of a stage of a cascade sorter with a level of temporary stores and a level of sorting exits.

FIG. 5 shows an embodiment of the first. cascade stage X3(*k*). In this embodiment a sequence of temporary stores Zw(1), Zw(2), . . . is arranged between the feed transport path Zuf-Tpf and the out-feed. transport path Weg-Tpf. For each temporary store Zw(1) the first cascade stage X3(*k*) comprises a feed path Zv(i) and an out-feed path Wv(i) respectively. The feed path Zy(i) begins in a branch Vz(j). A gate W(i) leaves a holding device either in the feed. transport path Zuf-Tpf or deflects the holding device in the branch Vz(i) into the feed path Zv(i). Each out-feed path Wv(1), WV(2), . . . ends in the out-feed transport path. In the example of FIG. 5 the selection unit has selected the temporary store Zw(3) for a holding device. The gate W(3) in the branch Vz(3) deflects the holding device from the feed transport path into the feed path Zv(3).

The holding devices with items of mail from a temporary store Zw(i) are preferably transported all at once from the temporary store Zw(i) into the out-feed transport path Tpf via the out-feed path Wv(i). In one embodiment the holding devices of a temporary store Zyg(i) remain in an output region AB (i) in the out-feed transport path Jul. Each temporary store Zw(i) is preferably emptied as soon as possible A. sequence of output regions AB(1), AB(2), AB(3), . . . is formed in the out-feed transport path. Once all temporary stores have been emptied, the holding devices are transported away from the output regions, all at once in the out-feed conveyor. Sorting into temporary stores already provides, a sequence among these holding devices.

Figure 6:
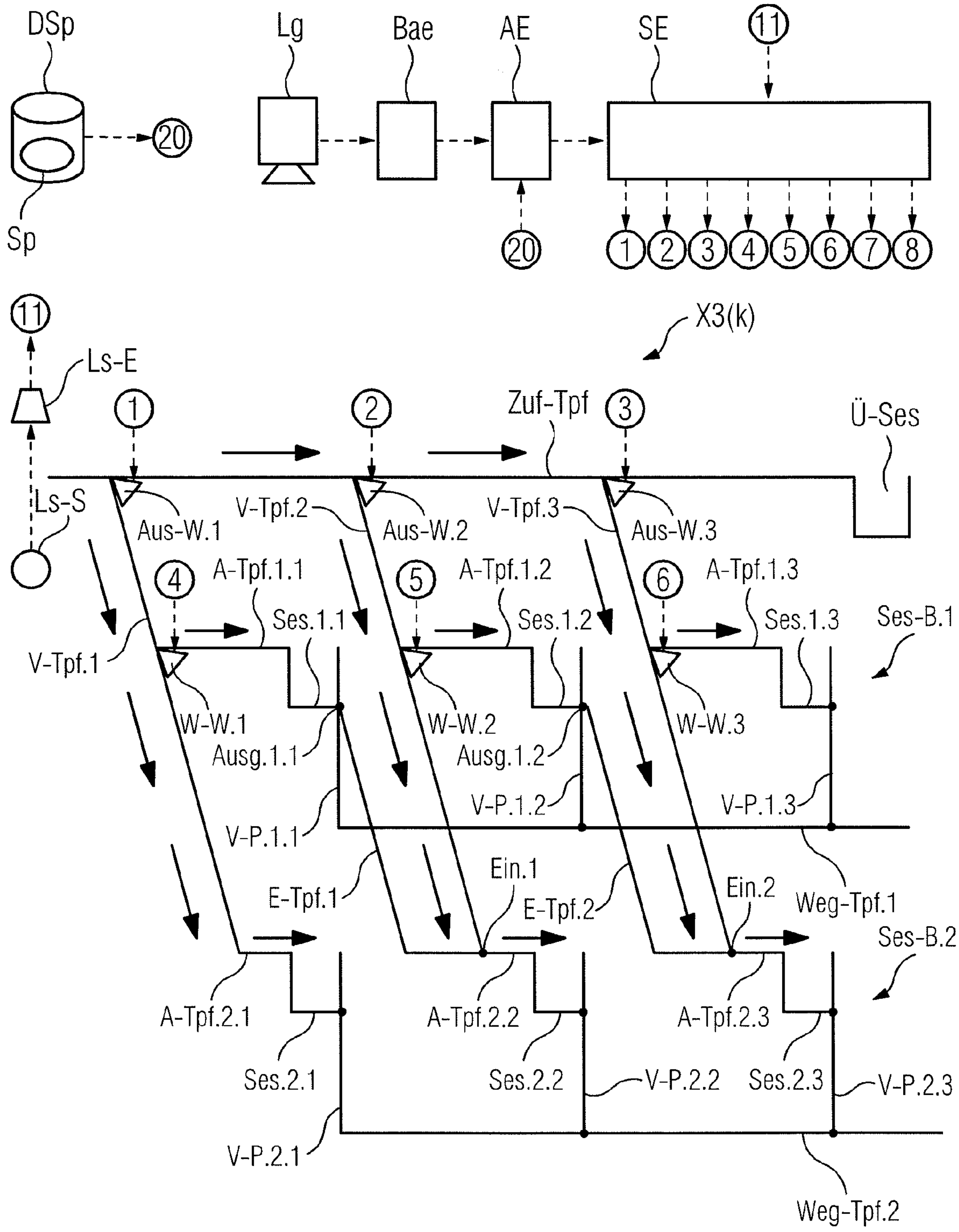
FIG. 6 shows a further embodiment of a stage of a cascade sorter with two levels of sorting exits located one above the other.

FIG. 6 shows by way of example a further embodiment of the first cascade stage X3(*k*) of a sorting subregion X2(*k*). This first cascade stage X3(*k*) comprises the following components:

- a light barrier with a transmitter Ls-S and a receiver Ls-E,
- a reader Lg for machine-readable identifiers on holding devices,
- an image evaluation. unit Bae,
- a selection. unit AE,
- a control unit SE,
- a feed transport path Zuf-Tpf,
- a first region of Ses-B.1 of sorting end points,
- a second region. of Ses-B.2 of sorting end points,
- a first out-feed transport path Weg.1 for the sorting end points of the first sorting end point region Ses-B.1,
- a second out-feed transport path Weg.2 for the sorting end points of the second sorting end point region. Ses-B.2.

In the example shown the first sorting end. point region Ses-B.1 includes three sorting end points Ses.1.1, Ses.1.2 and Ses.1.3. The second sorting end point region Ses-B.2 includes three sorting end points Ses.2.1, Ses.2.2, Ses.2.3. One output transport path respectively leads into each sorting end point of the first cascade stage X3(*k*). One output transport path A-Tpf. 1.1, A-Tpf.1.2, A-Tpf.1.3 respectively leads into the three sorting end points of the first sorting end point region Ses.1. One output transport path A-dpi:.2.1, A-Tpf.2.2, A-Tpf.2.3 respectively leads into the three sorting end points of the second. sorting end. point region Ses-B.2.

Moreover, the first cascade stage X3(*k*) comprises a plurality of routing gates. In the example of FIG. 6 the output transport. path A-Tpf.1.1 to the sorting end point Ses.1.1 begins in an exit of the routing gate W-W.1. The output transport path A-Tpf. 2.1 to the sorting end point Ses.2.1 begins in the other exit of the routing gate W-W.1. The two output transport paths A Tpf.1.2 to the sorting end point Ses.1.2 and the output transport path A-Tpf.2.2 to the sorting end point Ses.2.2 begin. in the two exits of the routing gate W-W.2 accordingly. The output transport path A-Tpf.1.3 to the sorting end point Ses.1.3 and the output transport path A-Tpf.2.3 to the sorting end point Ses.2.3 begin in the two exits of the routing gate W-W.3. A connection transport path, which begins in the feed transport path Zuf-Tpf, leads to one routing gate respectively. One discharge gate Aus-W.1, Aus-W.2, Aus-W.3, respectively is arranged in the feed transport path Zuf-Tpf for each connection transport path. The connection transport path V-Tpf.1 begins in an exit of the discharge gate Aus-W.1. The connection transport path V-Tpf.2 begins in an exit of the discharge gate Aus-W.2. The connection path V-Tpf.3 to the routing gate W-W.3 begins in an exit of the discharge gate Aus-W. 3.

The sorting end points Ses.1.1, Ses.1.2, . . . of the first sorting end point region Ses-B.1 are emptied via connection paths V-P.1.1, V-P.1.2, V-P.1.3. These connection paths lead. into the out-feed transport path Weg.1. Accordingly, the sorting end points Ses.2.1, Ses.2.2, . . . of the second sorting end point region Ses-B.2 are emptied by means of a plurality of connection paths VP.2.1, VP.2.2, . . . These connection paths VP.2.1, VP.2.2, . . . lead into the second. out-feed transport path Weg.2.

In one embodiment the sorting end points Ses.1.1, Ses.1.2, . . . of the first sorting end point region Ses-B.1 can also empty by means of emptying transport paths into at least one associated sorting end point respectively of the second sorting end point region Ses-B.2. In the example of FIG. 6 an emptying transport path E-Tpf.1 leads from an exit Ausg.1.1 of the sorting end point Ses.1.1 to the output transport path A-Tpf. 2.2 of the sorting end point Ses.2.2. This emptying transport path. E-Tpf.1 begins in the exit Ausg.1.1 of the sorting end point Ses.1.1 and ends in an entry site Ein.1 in the output transport path A-Tpf.2.2. Accordingly, an emptying transport path. E-Tpf.2 begins in the exit Ausq.1.2 of the sorting end point Ses.1.2 and ends in an entry site Ein.2 in the output transport path A-Tpf.2.3 of the sorting end point Ses.2.3.

The control unit SE is able to control the discharge gates Aus-W. 1, Aus-W.2, . . . and the routing gates W-W.1, W-W.2, . . . . The feed transport path Zuf-Tpf ends in an overflow sorting end point U-Ses.

The reader Lg scans the machine-readable identifier with which. a holding device is provided. This identifier uniquely identifies the holding device, i.e. this identifier distinguishes this holding device from all other holding devices of the sorting system. The image evaluation unit Bae deciphers this unique identifier of the holding device, for which the image evaluation unit Bae uses the scanning results of the reader Lg. By way of example, the image evaluation unit deciphers by "barcode scanning" a line pattern on the holding device. The selection unit AE determines what destination the item of mail which is currently in this holding device has. The selection unit selects a sorting end point of the first cascade stage X3(*k*). The selection unit controls the control unit SE in such a way that the holding device passes with the item of mail into that final sorting end point which the selection unit AE has selected for this holding device.

FIG. 5 and FIG. 6 both show a light barrier with a transmitter Ls-S and a receiver Ls-E. This light barrier sends signals to the control unit SE. The light barrier measures when a holding device with an item of mail is transported through the light barrier and therefore interrupts the light beam from the transmitter Ls-S.

As already stated, one completion time respectively is predetermined for each delivery area Zp(p) (p=1, . . . , z). The items of mail for delivery area Zp(p) must have been completely sorted by this completion time. It is also known how long each cascade sorter X3(*k*), X4(*k*) requires at most to bring the items of mail for the district area Zp(p) into the predetermined sequence of destinations. This time requirement is derived, for example, from previous sorting operations or on the basis of the design of the cascade sorter x3(*k*), x4(*k*).

A latest completion time is derived from the predetermined completion time and the maximum time requirement, by which time the items of mail for delivery area Z(p) must have left the sorting cascade stages X3(*k*), X4(*k*) of the selected sorting subregion. X2(*k*). From this latest completion time by which. the items of mail must have left the selected sorting subrecdon. X2(*k*), as well as from a maximum passage time of the items of mail through this sorting subregion X2(*k*), results a latest pre-sorting time at which items of mail for delivery area Z(p) must have left the storage subregion used X1(*i, j*). The storage subregion X1(*i, j*) is used for the items of mail for different delivery areas. This results in x2 different latest pre-sorting times for a storage subregion. X1(*i, j*). These constraints are used to fix the time sequence in which the storage subregions X1(*i, j*) are emptied.

In the embodiment described so far, just as many cascade sorters are used as there are feed transport paths, namely x2 cascade sorters. This results in a high throughput. It is also possible for less than x2 cascade sorters to be used and therefore at least three feed transport paths lead into the same cascade sorter. This design saves on cascade sorters.

In the application just described the sorting system according to the solution is used to sort items of mail exactly in accordance with route order. z different delivery areas Z(l), . . . , Z(z) of a delivery region W(p0) are predetermined. The sorting center to which the sorting system according to the solution belongs is responsible for this delivery region. W(p0) with the z delivery areas. The process of sorting the incoming items of mail of a delivery region exactly in accordance with the route orders for the z delivery areas is referred to as receiving sortation. Receiving sortation is preceded by dispatch sortation, which is also carried out in one embodiment by the sorting system according to the solution. In this dispatch sortation. the items of mail which arrive in a sorting center are apportioned to the w delivery regions of the relevant area. Each item of mail firstly passes through dispatch sortation and then receiving sortation.

The sorting system according to the solution preferably carries out dispatch sortation for the w delivery regions and receiving sortation. for the z delivery areas of their own delivery region W(p0) so as to overlap time-wise. The storage region X1 is used for the first phase of receiving sortation, i.e. incoming items of mail for receiving sortation are apportioned to the x1 storage subregions. Dispatch sortation is carried out simultaneously or so as to overlap time-wise in at least one sorting subregion X2(K) of the sorting region X2.

In one embodiment all x2 sorting subregions X2(1), . . . , X2(*x*2) are used for the dispatch sortation in the first phase. The holding devices, with the items of mail to be sorted are apportioned to the x2 sorting subregions. In one embodiment the holding devices are apportioned such that the x2 sorting subregions are utilized approximately uniformly. In a further embodiment a plurality of delivery regions respectively is assigned to each sorting subregion X2(*k*), and, more precisely, in such a way that exactly one sorting subregion X2(*k*) respectively is assigned to each delivery region. In both embodime.nts each item of mail is transported during dispatch sortation firstly the respectively selected or assigned sorting subregion X2(*k*) The holding devices with the items of mail are fed directly into the associated sorting subregion X2(*k*) and do not pass through the storage region X1. Storage region X1 is consequently already available for receiving sortation.

The sorting center, in which the sorting system according to the solution is located, is responsible for its own delivery region W(p0) and carries out receiving sortation for its own delivery region. W(p0). In one embodiment all items of mail, including those for its own delivery region W(p0), are nevertheless moved during dispatch sortation into the respectively assigned sorting subregion. X2(*k*) Receiving sortation for items of mail, which have already been sorted in a previous dispatch sortation, for example the day before, and have been transported to this sorting system for the delivery region W(p0), is preferably carried out in storage region X1.

In a preferred embodiment the items of mail are separated for their own delivery region W(p0) as early as during dispatch sortation and are moved into the storage subregion X1. The item of mail is transported into the assigned storage subregion /X1(*i, j*) as a function of the respective delivery address of an item of mail for its own delivery area W(p0). Once the first phase is complete this item of mail is transported in its holding device from the storage subregion X1(*i, j*) into the assigned sorting subregion X2(*k*) In this embodiment the item of mail for its own delivery area W(p0) passes through a sorting system only once, and dispatch sortation and receiving sortation are carried out in the same sorting pass for this item of mail.

Figure 7:
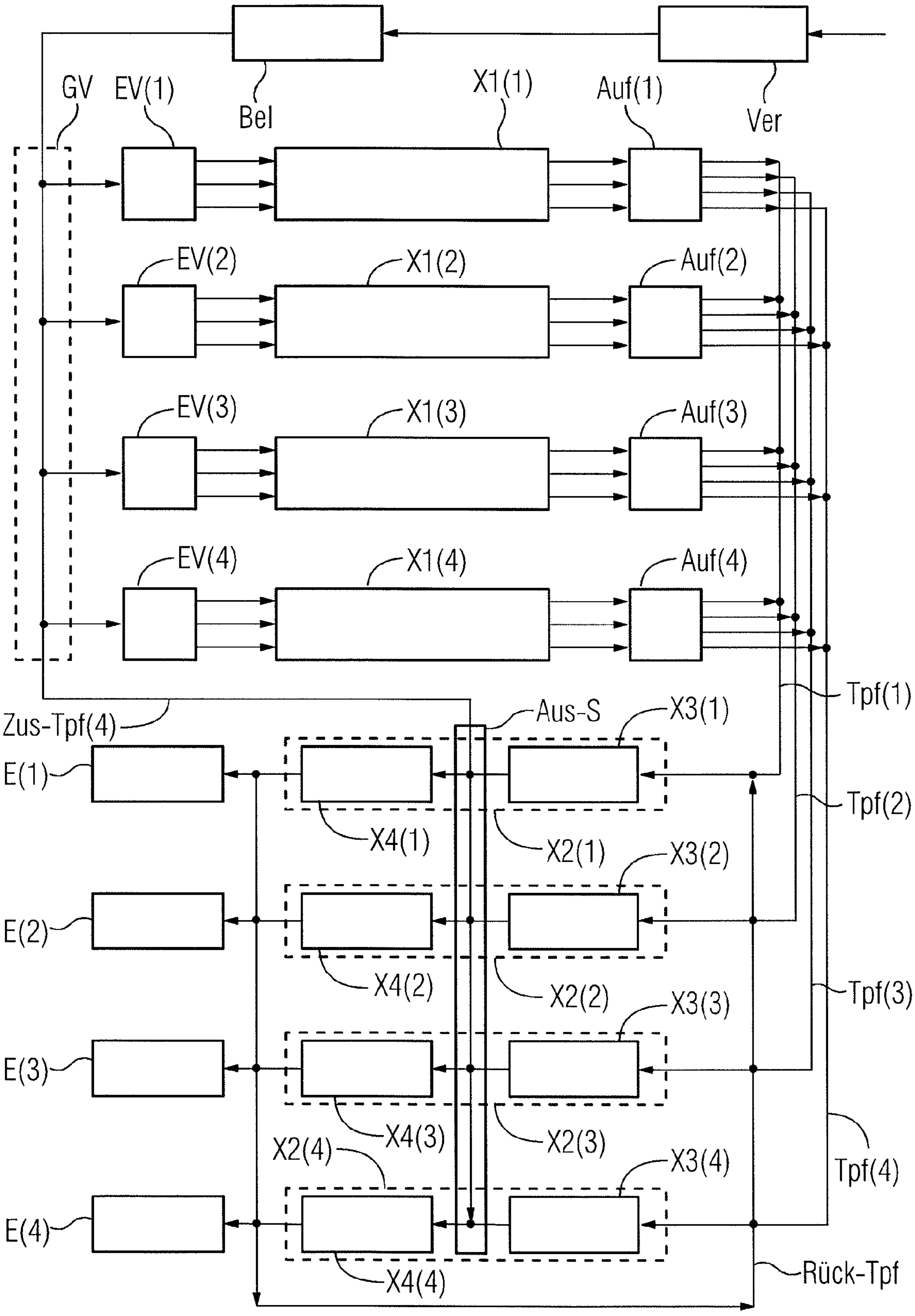
FIG. 7 shows a modification of the sorting system of FIG. 1, wherein this modification is used for the temporally overlapping execution of receiving sortation in the storage region and dispatch sortation in the sorting region.

FIG. 7 shows an embodiment of the sorting system of FIG. 1. This sorting system carries oar receiving sortation for the delivery regions W(p0) and dispatch sortation for the other delivery regions so as to overlap time-wise. Apart from the y4 exits for the y4 storage devices the overall pre-sorter GV has a further exit which ends in an auxiliary transport path. Zus-Tpf. This additional transport path Zus-Tpf .leads to a further apportioning device Auf-S with x2 exits. This apportioning device Auf-S apportions holding devices with items of mail to the respective second sorting cascade stage X4(1), . . . , X4(*x*2) of the x2 sorting subregions X2(1), . . . , X2(*x*2), and, more precisely, either following utilization of the sorting subregions or as a function of a predetermined assignment of the w delivery regions to the x2 sorting subregions. Each holding device with an item. of mail is fed. into the feed transport path Tpf (k) to the selected sorting subregion. X2(*k*). For the sake of clarity the evaluation unit AE and control unit SE are not shown in FIG. 7.

Downstream of each second sorting cascade stage X4(1), . . . , X4(*x*2) is arranged a return. transport path. Rück-Tpf. This return transport path Ruck-Tpf is able to transport holding devices with items of mail back to the first sorting cascade stage X3(1), . . . , X3(*x*2) respectively. Every sorting cascade stage can consequently be reached by every second sorting cascade stage, cf. FIG. 7. This allows any holding device with an item of mail to pass through the sorting cascade stage twice—or even more often. Items of mail are fed to the sorting system in FIG. 7. It is determined to which delivery region W(1), . . . , W (w) the destination of a supplied item of mail belongs. if this delivery region is the "own" delivery region W(p0) then the delivery area of this destination is determined as well. The item of mail is then moved into a holding device.

The overall pre-sorter GV then discharges the holding device with the item of mail into an individual item pre-sorter EV(1) of a storage arrangement X1(*i*) sf the item of mail is to be transported to a delivery area of delivery region W(p0) and the storage arrangement X1(*i*) is assigned to the destination of the item of mail. The individual item pre-sorter EV(i) relays the item of mail into the assigned storage subregion of X1(*i, j*) for this destination. From there the holding device with the item of mail is subsequently transported into a sorting subregion X2(*k*)

If, by contrast, the item of mail is to be transported to a destination outside of its own delivery region W(p0), namely to a destination in the delivery region W(p) where p# p0, the overall pre-sorter GV discharges the holding device with the item of mail into the additional transport path Zus-Tpf. The additional transport path Zus-Tpf transports the holding device with the item of mail further to the supporting device Auf-S. The apportioning device Auf-S selects a sorting subregion X2(*k*) for the item of mail, and, more precisely, as just described, either as a function of the utilization of the sorting subregions or a predetermined assignment of the delivery regions to the sorting subregions.

The storage region X1 carries out the first phase of receiving sortation for the z delivery areas Z(I), . . . , Z(z) of the delivery region W(p0). The sorting region. X2 carries out dispatch sortation so as to overlap time-wise or even simultaneously for the items of mail to the other delivery regions. In one embodiment the first stages X3(I), . . . , X3(*x*2) or the second stages X4(1), . . . , X4(*x*2) of the x2 cascade sorters of sorting subregion X2 are used. The arrangement of FIG. 6 is preferably used. The sorting end points of the first level Ses-B.1 and the sorting end points of the second level Ses-B.2 are used. The arrangement of FIG. 6 is designed such that more sorting end points are used than there are delivery areas in the delivery region W(p0). The number of sorting end points used is therefore greater than or equal to z. Only one cascade stage is required therefore. The sorted holding devices from the first stage X3(*k*) are transported to the discharge station. E(k) (k=1, . . . , x2).

Once all items of mail for delivery region W(p0) have been apportioned to the storage subregions and the items of mail for the other delivery regions of sorting region X2 have been sorted, sorting region X2 is emptied. Dispatch sortation for the other delivery regions and the first phase of receiving sortation for their own delivery region W(p0) are in fact now complete. Now the second phase of receiving sortation for their own delivery region W(0) is carried out as described above. The cascade sorters X3(1), X4(1), . . . , X3(*x*2), X4(*x*2) sort the items of mail for their own delivery region W(p0) exactly in accordance with the route order. Both cascade stages X3(*k*), X4(*k*) of each sorting subregion X2(*k*) are required for this purpose. The first level X3(*k*) carries out a first sorting pass, the second stage X4(*k*) a second sorting pass.

If the arrangement of FIG. 5 is used as a cascade stage then each item of mail takes the following path: feed transport path Zuf-Tpf of the first stage X3(*k*)—selected temporary store Zw(r1) of the first stage X3(*k*)—out-feed transport path Weg-Tpf of the first stage X3(*k*)—feed transport path Zuf-Tpf of the second stage X4(*k*)—selected temporary store Zw (r2) of the second stage X4(*k*)—out-feed transport path. Weq-Tpf of the second. stage X4(*k*)

If the arrangement of FIG. 6 is used as a cascade stage then preferably only one sorting end point level of the first stage X3(*k*) and one sorting end point level of the second stage X4(*k*) is used, for example, the top level Ses-B.1 both times. Each item of mail takes the following path through the cascade sorter X3(*k*), X4(*k*) feed transport path. (Zuf-Tpf) of the first stage X3(*k*)—connection transport path V-Tpf.r1 for the selected. sorting end. point Ses.1.ri—output transport path A-Tpf.i.r 1 to the selected sorting end point Ses.1.r1—selected sorting end point Ses.1.ri—out-feed transport path WegTpf.1 of the upper level Ses-B.1—feed transport path. Zuf-Tpf of the second. stage X4(*k*)—connection transport. path. V.Tpf.1.r2—output transport path A-Tpf.1.r2—selected sorting end point Ses.1.r2—out-feed transport path WegTpf.1 of the upper level Ses-B.1 of the second level X4(*k*)

Figure 8:
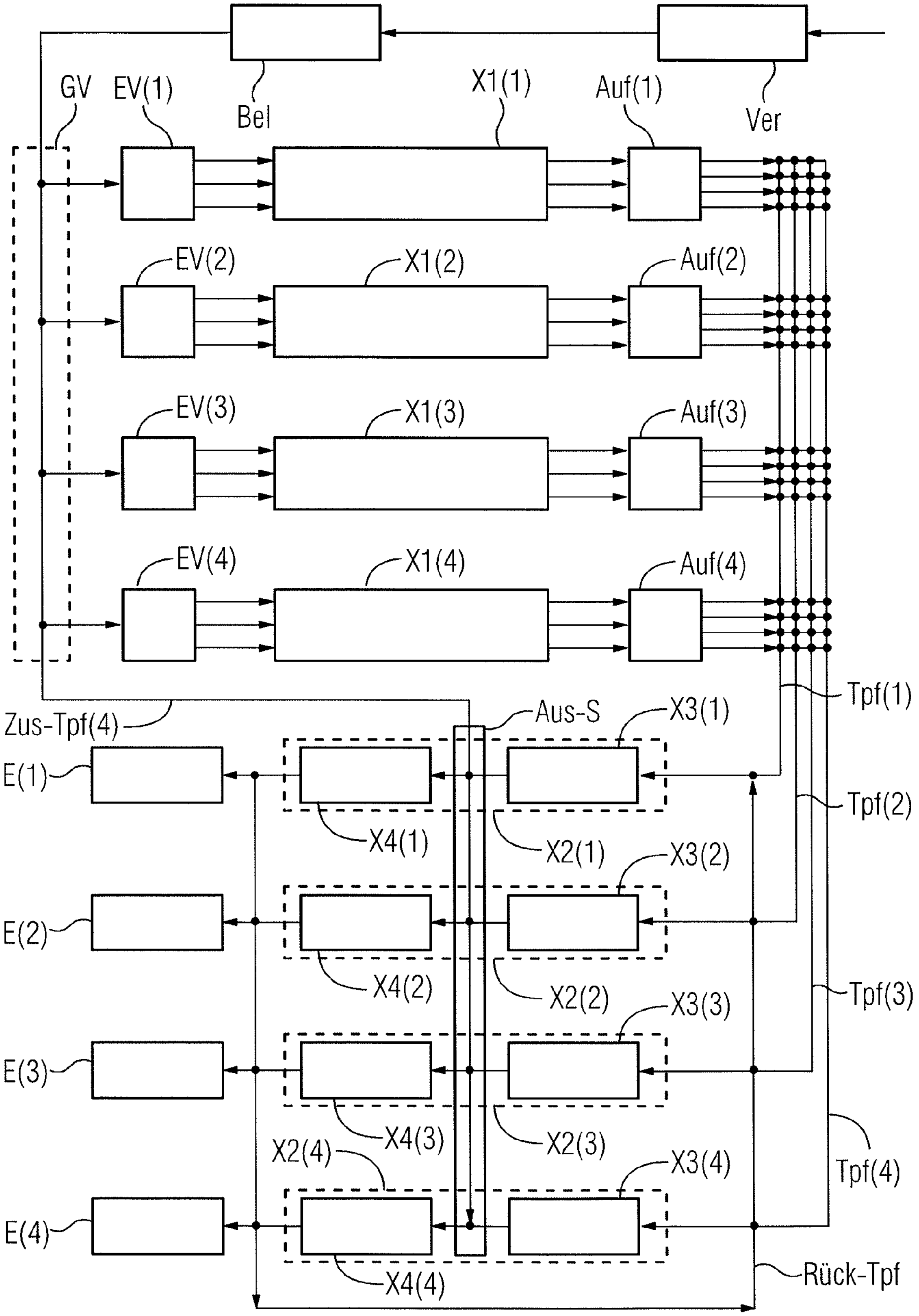
FIG. 8 shows a further modification of the sorting system of FIG. 1.

FIG. 8 shows a further modification of the sorting system of FIG. 1. In FIG. 7, each apportioning device Auf(i) of the storage arrangement X1(*i*) is connected to exactly one sorting subregion X2(*i*) (i=1, . . . , x2). However, the case may occur where a sorting region X2(*k*) temporarily fails during operation. or, for example, is not available due to maintenance.

In the embodiment of FIG. 8 the situation is achieved where sorting can still be continued.

In the embodiment of FIG. 8 each apportioning device Auf(i) is connected to each sorting subregion X2(*k*). Therefore, it is possible for items of mail to be guided by the apportioning device Auf(i) into a sorting subregion X2(*k*) where k≠i. In the event. that a sorting subregion X2(*k*) is temporarily unavailable, only the controller and the sorting plans of the sorting system need to be changed. Mechanical modification of the sorting system is not required.

LIST OF REFERENCE CHARACTERS

| Reference character | Meaning |
|---|---|
| A-Tpf.1.1, A-Tpf.1.2, . . . | Output transport path to sorting end points of the first sorting end point region Ses-B.1 |
| A-Tpf.2.1, A-Tpf.2.2, . . . | Output transport path to sorting end points of the second sorting end point region Ses-B.2 |
| Abzw(i) | Branch region of the further apportioning device Auf(i) |
| AE | Selection unit |
| Auf(i) | Apportioning device of the storage arrangement X1(i) (i = 1, . . . , y4) |
| Auf-S | Further apportioning device |
| Aus-W.1, Aus-W.2 | Discharge gates in the feed transport path Zuf-Tpf |
| Bel | Loading station, loads one holding device respectively with an item of mail |
| Bae | Image evaluation unit |
| DSp | Data store with the computer-accessible sorting plan Sp |
| E(k) | Unloading station of the storage subregion X2(k)(j = 1, . . . , x2) |
| EV(i) | Individual item pre-sorter of the storage arrangement X1((i) (i = 1, . . . , y4) |
| Fb(i, j, l), . . . , Fb(i, j, y3) | Y3 storage lines (conveyors) of the storage subregion. X1(i, j) |
| GV | Overall pre-sorter |
| Hv | Holding device in the form of a storage pocket for an item of mail |
| Ka | Camera |
| Kop | Coupling element of the storage pocket Hv |
| Ls-E | Receiver of a light barrier in the feed transport path. Zuf-Tpf |
| Ls-S | Transmitter of a light barrier for the feed transport path Zuf-Tpf |
| N1 | Number of storage pockets of the first type of storage pocket in a storage arrangement X1(i) |
| N2 | Number of storage pockets of the second type of storage pocket in a storage arrangement X1(i) |
| Ps | Item of mail in the storage pocket Hv |
| SE | Control unit |

-continued

| Reference character | Meaning |
|---|---|
| Ses-B.1 | First region of sorting end point region, located in the upper plane |
| Ses-B.2 | Second region of sorting end point region, located in the lower plane |
| Ses.1.1, Ses.1.2, . . . | Sorting end points of the first sorting end point region Ses-B.1 |
| Ses.2.1, Ses.2.2, . . . | Sorting end points of the second sorting end point region Ses-B.2 |
| Sf.1, Sf.2 | Side surfaces of the storage pocket Hv |
| Sp | Computer-accessible sorting plan in the data storage device DSp |
| Tpf(k) | Feed transport path of the sorting subregion X2(k) (k = 1, . . . , x2) |
| U-Ses | Overflow sorting end point |
| Ver | Singulator |
| Vz(1), Vz(2), . . . | Branching points in the feed transport path Zuf-Tpf |
| V-P.1., V-P.1.2, . . . | Connection paths from the sorting end points of the first sorting end point region Ses-B.1 to the first out-feed transport path Weg-Tpf.1 |
| VP.2.1, VP.2.2, . . . | Connection paths from the sorting end points of the second sorting end point region Ses-B.2 to the second out-feed transport path Weg-Tpf.2 |
| V-Tpf.1, V Tpf.2, . . . | Connecting transport paths from the feed transport path Zuf-Tpf to the routing gates W-W.1, W-W.2, . . . |
| W | Number of delivery regions |
| W(l), . . . , W(w) | Delivery regions |
| W(p0) | "Own" delivery region of the sorting system according to the solution |
| Weg-Tpf.1 | Out-feed transport path of the first sorting end point region Ses-B.1 |
| Weg-Tpf.2 | Out-feed transport path of the second sorting region Ses-B.2 |
| W(1), W(2), . . . | Gates at the branch points Vz (1), Vz(2), . . . in the feed transport path Zuf-Tpf of the cascade stage X3(k) |
| Weg-Tpf | Out-feed transport path |
| Wv(1), Wv(2), . . . | Out-feed paths from the temporary stores Zw(1), Zw(2), . . . to the out-feed transport path Weg-Tpf |
| W-W.1, W-W.2, . . . | Routing gates in which two output transport paths respectively begin |
| X1 | Storage region with y4 storage arrangements |
| x1 | Number of storage subregions of the storage region X1, x1 = y4 * y3 |
| X1(i, 1), . . . , X1(i, y3) | Storage subregions of the storage arrangement X1(i) (i = 1, . . . , y4) |
| X1(i, 1), . . . , X1(y4) | Storage arrangements of the storage region X1, comprise y3 storage subregions respectively |
| X2 | Sorting region with x2 sorting subregions |
| x2 | Number of sorting subregions ("cascade towers") in the sorting region X2, at the same time the number of assigned delivery regions per storage subregion X1(i, j) |
| X2(1), . . . , X2(x2) | Sorting subregions of the sorting region X2 |
| X3(k) | First sorting cascade stage of the sorting subregion X2(k), has x3 temporary stores (k = 1, . . . , x2) |
| X4(k) | Second sorting cascade stage of the sorting subregion X2(k), has x3 temporary stores (k = 1, . . . , x2) |
| x3 | Number of temporary stores in each first sorting cascade stage X3(k) |
| x4 | Number of temporary stores in each second sorting cascade stage X4(k) |
| y1 | Number of storage lines per storage subregion X1(i, j) (i = 1, . . . , yl; j = 1, . . . , y3) |
| y2 | Number of storage pocket types, preferably y2 = 2 |
| y3 | Number of storage subregions per storage arrangement X1(i) (i = 1, . . . , y4) |

-continued

| Reference character | Meaning |
|---|---|
| y4 | Number of storage arrangements ("storage towers") in the storage region X1 |
| Z(1), . . . , Z(z) | Delivery areas |
| z | Number of delivery areas |
| Zp (p) | Number of destinations in the delivery area Z(p) (p = 1, . . . , Z) |
| Zuf-Tpf | Feed transport path to a cascade stage X3(k), X4 (k) |
| Zv(1), Zv(2), . . . | Feed paths from feed transport path Zuf-Tpf to the temporary stores Zw(1), Zw(2), . . . |
| Zw(1), Zw(2), . . . | Temporary storage facility of a cascade stage X3(k), X4(k) |

The invention claimed is:

1. A method of sorting articles in accordance with a predetermined sorting feature, wherein the sorting feature for each article assumes one value respectively, the method comprising:

apportioning the sorting feature values that occur to predetermined z≥2 value groups of sorting feature values such that each sorting feature value belongs to exactly one value group;

providing a sorting system sorting with:

a storage region having X1 >=2 storage subregions;

a sorting region having x2 >=2 sorting subregions;

where x1*x2≥z; and a computer-accessible sorting plan which assigns to each value group:

one storage subregion respectively; and one sorting subregion respectively;

carrying out the following steps for each article to be sorted:

measuring the value group to which the sorting feature value of the given article belongs; and transporting the article into that storage subregion which the sorting plan assigns to that value group to which the sorting feature value of the article belongs;

carrying out an apportionment step for each storage subregion consecutively, wherein execution of the apportionment steps is completed once all articles to be sorted have been transported into the storage region and have been apportioned to the storage subregions;

during the apportionment step for a storage subregion, transporting all articles out of this storage subregion to the sorting region; and apportioning the articles transported to the sorting region to the x2 sorting subregions such that each article is transported into that sorting subregion which the sorting plan assigns to that value group to which the sorting feature value of the article belongs;

carrying out the apportionment steps such that:

during apportionment to the sorting subregions mixing of articles from different storage subregions is prevented, and all articles, whose sorting feature values belong to the same value group, are located in the same sorting subregion after an apportionment step; and after each apportionment step for each sorting subregion a sorting and output step is carried out; and wherein in a sorting and output step for a sorting subregion, all articles in this sorting subregion:

are placed into a given sequence such that those articles whose sorting feature values belong to the same value group occur immediately one after the other in the given sequence; and are transported from the sorting subregion in the given sequence.

2. The method according to claim 1, which comprises:

predetermining for each value group one sequence respectively of the sorting feature values of this group;

wherein the sorting system includes at least one further sorter; and each sorting and output step for a sorting subregion includes the steps of:

transporting the articles, whose sorting feature values belong to the same value group and which were transported into this sorting subregion during a sorting step, to at least one of the further sorters; and sorting these articles with the further sorter according to the predetermined value sequence of the sorting feature values of this value group.

3. The method according to claim 2, wherein each sorting subregion has one further sorter respectively, and the sorting and output step for a sorting subregion comprises sorting the articles with the further sorter of this sorting subregion according to the predetermined value sequence.

4. The method according to claim 3, wherein the x2 further sorters sort articles with a temporal overlap.

5. The method according to claim 1, wherein at least one storage subregion has at least one conveying device, Fb, each conveying device, Fb having a beginning and an end;

the step of transporting an article to be sorted into a storage subregion comprises the steps of transporting the article at the beginning of a conveying device of the storage subregion, and in a direction towards the end of the conveying device, Fb, and the step, during an apportionment step for this storage subregion, of transporting this article from this storage subregion to the sorting region, comprises the steps of transporting the article to the end of the conveying device, Fb and transporting the article from there to the sorting region.

6. The method according to claim 1, which comprises:

predetermining a physical parameter and a first subregion and a second subregion of the value range of the physical parameter;

providing at least one storage subregion with a first conveying device and a second conveying device each having a beginning and an end; and carrying out the following steps for each article to be sorted, if the value assumed by the physical parameter for this article belongs to the first subregion, transporting the article to the first conveying device, and if the value assumed by the physical parameter for this article belongs to the second subregion, transporting the article to the second conveying device.

7. The method according to claim 1, which comprises grasping and holding each article at all times by a transport device, during transportation into a storage subregion, during transportation within the storage subregion, and during an apportionment step.

8. The method according to claim 1, wherein the sorting system has a plurality of holding devices, and each holding device is in each case able to hold an article to be sorted and is capable of being transported, and wherein:

the step of transporting the article into a storage subregion comprises:

moving this article into a holding device, and transporting the holding device with this article into the storage subregion;

the step of transporting this article during an apportionment step into a sorting subregion comprises transporting the holding means with the article into the sorting subregion; and the step of outputting this article in a sorting and output step comprises outputting the holding device with the article from the sorting subregion.

9. The method according to claim 1, which comprises transporting a plurality of further articles to be sorted to an apportioning device and distribuing with the apportioning device the further articles to the sorting subregions.

10. The method according to claim 9, which comprises carrying out the steps of transporting the articles to the storage subregions; and apportioning the articles with the apportioning device with a temporal overlap.

11. A sorting system for sorting articles according to a predetermined sorting feature, which assumes one sorting feature value respectively for each article, wherein the sorting feature values which occur are apportioned to predetermined $z \geq 2$ value groups of sorting feature values such that each sorting feature value belongs to exactly one value group, the sorting system comprising:

a storage region formed with $x1 \geq 2$ storage subregions;

a sorting region formed with $x2 \geq 2$ sorting subregions;

where $x1 * x2 \geq z$;

a data storage device with a computer-accessible sorting plan configured to assign to each value group one storage subregion respectively and one sorting subregion respectively, a measuring instrument configured for measuring which value the sorting feature assumes for an article to be sorted;

said sorting system being configured to carry out the following steps for each article to be sorted:

measuring with the measuring instrument to which value group the sorting feature value of the given article belongs; and transporting the article into that storage subregion which the sorting plan assigns to that value group to which the sorting feature value of the article belongs;

the sorting system being further configured to consecutively carry out one apportionment step respectively for each storage subregion, and to terminate execution of the apportionment steps once the sorting system has transported all articles to be sorted into the storage region and apportioned them to the storage subregions; and wherein, during the apportionment for a storage subregion, the sorting system is configured to:

transport all articles from this storage subregion to the sorting region; and apportion these articles to the x2 sorting subregions such that each article is transported into that sorting subregion which the sorting plan assigns to that value group to which the sorting feature value of the article belongs;

the sorting system being further configured to carry out the apportionment steps such that during apportionment to the sorting subregions mixing of articles from different storage subregions is prevented, and the articles whose sorting feature values belong to the same value group are located in the same subregion after an apportionment-sorting step; and the sorting system being further configured to carry out one sorting and output step respectively after each apportionment step for each sorting subregion, and wherein:

in a sorting and output step for a sorting subregion the sorting system puts all articles in this sorting subregion into a sequence such that all articles whose sorting feature values belong to the same value group occur in this sequence immediately one after the other; and are transported from the sorting subregion in this sequence.

12. The sorting system according to claim 11, wherein each storage subregion is connected to each sorting subregion in such a way as to enable an article to be sorted to be transported from any storage subregion into any sorting subregion.

* * * * *